United States Patent
Kimura

(10) Patent No.: US 12,301,894 B2
(45) Date of Patent: May 13, 2025

(54) INFORMATION PROCESSING DEVICE THAT DELIVERS MOVING IMAGE ON BET, INFORMATION PROCESSING METHOD FOR DELIVERING MOVING IMAGE ON BET, AND INFORMATION PROCESSING SYSTEM FOR DELIVERING MOVING IMAGE ON BET

(71) Applicant: mixi, Inc., Tokyo (JP)

(72) Inventor: Koki Kimura, Tokyo (JP)

(73) Assignee: MIXI, INC., Tokyo (JP)

( * ) Notice: Subject to any disclaimer, the term of this patent is extended or adjusted under 35 U.S.C. 154(b) by 415 days.

(21) Appl. No.: 17/765,706

(22) PCT Filed: Oct. 21, 2021

(86) PCT No.: PCT/JP2021/038949
§ 371 (c)(1),
(2) Date: Mar. 31, 2022

(87) PCT Pub. No.: WO2022/091940
PCT Pub. Date: May 5, 2022

(65) Prior Publication Data
US 2023/0199230 A1    Jun. 22, 2023

(30) Foreign Application Priority Data

Oct. 29, 2020  (JP) ................................ 2020-181304

(51) Int. Cl.
*H04N 21/2187* (2011.01)
*A63F 13/79* (2014.01)
(Continued)

(52) U.S. Cl.
CPC ......... *H04N 21/2187* (2013.01); *A63F 13/79* (2014.09); *A63F 13/85* (2014.09);
(Continued)

(58) Field of Classification Search
CPC .......... H04N 21/251; H04N 21/25891; H04N 21/2668; H04N 21/4758; G07F 17/32; G07F 17/3288
See application file for complete search history.

(56) References Cited

U.S. PATENT DOCUMENTS 7,379,886 B1 *  5/2008  Zaring .................... G07F 17/32
                                                    705/5
7,742,972 B2 *  6/2010  Lange .................... G06Q 40/04
                                                    463/28
(Continued)

FOREIGN PATENT DOCUMENTS

JP    2002320214 A    10/2002
JP    2006085442 A    3/2006
(Continued)

OTHER PUBLICATIONS

Search Report mailed Sep. 22, 2023 issued in corresponding European Application No. 21870553.1 (full English text), 11 pages.
(Continued)

*Primary Examiner* — Chase E Leichliter
(74) *Attorney, Agent, or Firm* — MUNCY, GEISSLER, OLDS & LOWE, P.C.

(57) ABSTRACT

The present invention aims to provide an information processing device, information processing method, and program capable of more effectively delivering, to a user, a moving image on a bet made by predicting an outcome of a predetermined competition. The information processing device is configured to deliver, to a user, a moving image on a bet made by predicting an outcome of a predetermined competition, the information processing device including a processor. The processor selects, out of a plurality of the moving images, a part of the moving images as a delivery candidate moving image based on a predetermined criterion;
(Continued)

and sends the user a list indicating the delivery candidate moving image thus selected.

20 Claims, 15 Drawing Sheets

(51) Int. Cl.
*A63F 13/85* (2014.01)
*G06Q 50/34* (2012.01)
*G07F 17/32* (2006.01)
*H04N 21/234* (2011.01)

(52) U.S. Cl.
CPC .............. *G06Q 50/34* (2013.01); *G07F 17/32* (2013.01); *G07F 17/3244* (2013.01); *G07F 17/3251* (2013.01); *G07F 17/3288* (2013.01); *H04N 21/23418* (2013.01)

(56) References Cited

U.S. PATENT DOCUMENTS

| | | | | |
|---|---|---|---|---|
| 8,532,798 | B2* | 9/2013 | Ferraro, III | G06Q 90/00 463/9 |
| 11,238,704 | B1* | 2/2022 | Weaver | G07F 17/329 |
| 2006/0183547 | A1* | 8/2006 | McMonigle | G07F 17/3288 463/40 |
| 2007/0060380 | A1* | 3/2007 | McMonigle | G07F 17/3288 463/42 |
| 2007/0225069 | A1* | 9/2007 | Garahi | H04N 7/163 463/25 |
| 2007/0233585 | A1* | 10/2007 | Ben Simon | G07F 17/3244 705/35 |
| 2007/0273488 | A1* | 11/2007 | Le | H04N 21/8545 340/323 R |
| 2008/0064490 | A1* | 3/2008 | Ellis | H04N 21/47 463/25 |
| 2008/0066111 | A1* | 3/2008 | Ellis | H04N 21/458 725/57 |
| 2008/0081684 | A1* | 4/2008 | Lutnick | A63F 3/0434 463/16 |
| 2008/0182651 | A1* | 7/2008 | Marshall | G07F 17/3288 463/25 |
| 2008/0234051 | A1* | 9/2008 | McNutt | G07F 17/3288 463/25 |
| 2009/0163269 | A1* | 6/2009 | Yamagishi | G07F 17/3288 463/25 |
| 2009/0270166 | A1* | 10/2009 | Thukral | G06F 16/44 463/25 |
| 2010/0144428 | A1* | 6/2010 | Fontaine | G07F 17/32 463/28 |
| 2011/0003634 | A1* | 1/2011 | Manteris | G07F 17/32 463/25 |
| 2012/0062750 | A1* | 3/2012 | Nakajima | G07F 17/323 348/157 |
| 2013/0036438 | A1* | 2/2013 | Kutaragi | H04N 21/4821 725/38 |
| 2014/0274311 | A1* | 9/2014 | Aronowitz | G07F 17/326 463/25 |
| 2016/0188725 | A1* | 6/2016 | Wang | G06F 16/9535 707/734 |
| 2017/0011484 | A1* | 1/2017 | Emura | G06Q 50/34 |
| 2017/0072321 | A1* | 3/2017 | Thompson | A63F 13/61 |
| 2018/0365788 | A1* | 12/2018 | Said | G06Q 50/34 |
| 2019/0076741 | A1* | 3/2019 | Thompson | H04N 21/21805 |
| 2019/0122500 | A1* | 4/2019 | Joao | G06T 19/006 |
| 2020/0034887 | A1* | 1/2020 | Hamedi | G06Q 30/0244 |
| 2020/0042610 | A1* | 2/2020 | Boles | G06Q 30/0244 |
| 2021/0074127 | A1* | 3/2021 | Fleck | G07F 17/3269 |
| 2021/0136456 | A1* | 5/2021 | Srinivasan | H04N 21/44 |
| 2021/0142626 | A1* | 5/2021 | Pillay | G07F 17/3288 |
| 2022/0207964 | A1* | 6/2022 | Kuriyama | G07F 17/3211 |
| 2022/0207965 | A1* | 6/2022 | Komaki | G07F 17/3223 |
| 2022/0215501 | A1* | 7/2022 | Ishii | G07F 17/3276 |
| 2022/0351569 | A1* | 11/2022 | Ikeda | G07F 17/323 |
| 2023/0199230 | A1* | 6/2023 | Kimura | H04N 21/251 725/34 |

FOREIGN PATENT DOCUMENTS

| | | |
|---|---|---|
| JP | 2007325117 A | 12/2007 |
| JP | 2010160612 A | 7/2010 |
| JP | 2012014659 A | 1/2012 |
| JP | 2016184382 A | 10/2016 |
| JP | 2018133696 A | 8/2018 |
| JP | 2021089770 A | 6/2021 |
| WO | WO2011126134 A1 | 10/2011 |

OTHER PUBLICATIONS

Internation Search Report dated Jan. 11, 2022 in PCT/JP2021/038949, 3 pages.

Office Action mailed Feb. 24, 2021 in JP Application No. 2020-181304, 5 pages.

Office Action mailed Jul. 13, 2021 in JP Application No. 2020-181304, 4 pages.

\* cited by examiner

FIG. 4

| USER RELATED INFORMATION | | | | | | | | | | | | |
|---|---|---|---|---|---|---|---|---|---|---|---|---|
| NAME | ID | PROFILE | | MOVING IMAGE VIEWING HISTORY | | | BETTING HISTORY | | | WIN RECORD | NUMBER OF COINS HELD BY USER | USER'S BELONGING GROUP |
| | | SEX | AGE | OCCUPATION | VIEWING DATE | MOVING IMAGE ID | BANDWAGON BET | BETTING DATE | BETTING ID | WIN AMOUNT | WIN RATE | NUMBER OF WINS | NUMBER OF VICTORIES | | |

FIG. 5

| MOVING IMAGE RELATED INFORMATION | | | | | | | | |
|---|---|---|---|---|---|---|---|---|
| MOVING IMAGE ID | DELIVERY DATE | GROUP | PERFORMER INFORMATION | | | | ATTRIBUTE (CATEGORY) | TARGET RACE INFORMATION | EVALUATION VALUE |
| | | | USER ID | BETTING AMOUNT | NUMBER OF VICTORIES | NUMBER OF WINS | WIN AMOUNT | WIN RATE | | | |

FIG. 6

| BETTING RELATED INFORMATION | | | | | | | | | |
|---|---|---|---|---|---|---|---|---|---|
| BETTING ID | BETTING USER ID | RACE ID | RACE DATE AND LOCATION | BETTING TYPE | PREDICTION CONTENT | BETTING AMOUNT | ODDS | BETTING TIME | SOURCE MOVING IMAGE |

FIG. 7

| RACE RELATED INFORMATION | | | | | | | | |
|---|---|---|---|---|---|---|---|---|
| RACE ID | GRADE | DATE HELD | VENUE | TYPE | COMPETITOR INFORMATION | BETTING CANDIDATE INFORMATION | | |
| | | | | | | CANDIDATE ID | BETTING CONTENT | ODDS |

FIG. 8

| WIN OUTCOME INFORMATION | | | | | |
|---|---|---|---|---|---|
| BETTING ID | BETTING USER ID | RACE ID | WHETHER BET IS WON | WIN AMOUNT | PAYOUT DUE DATE |

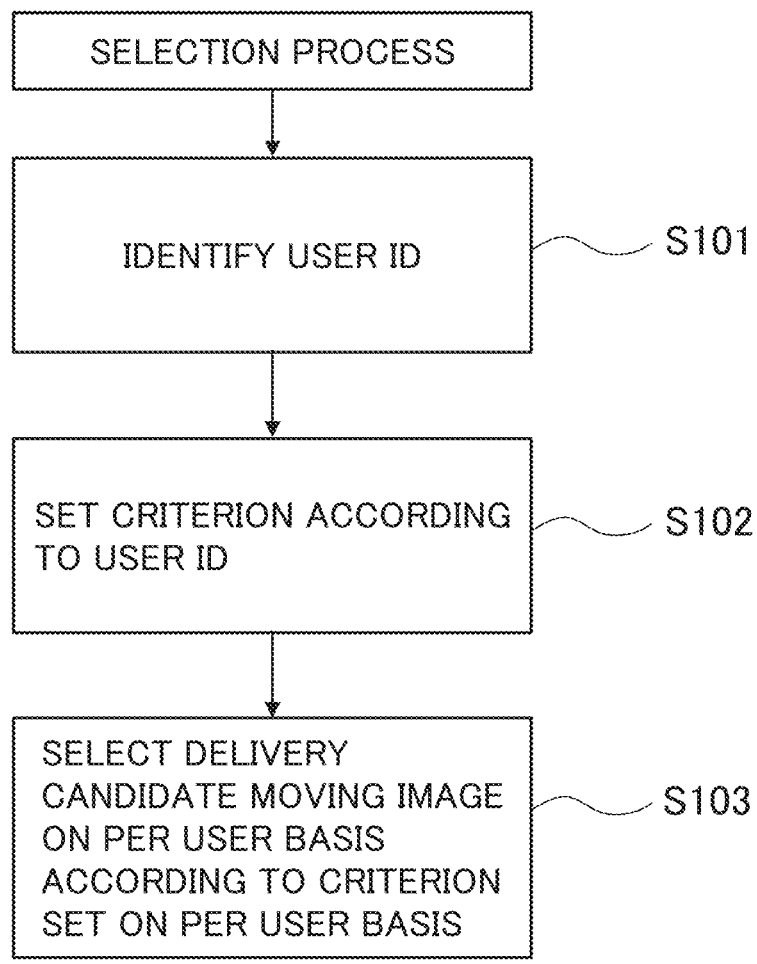

FIG. 14

| USER RELATED INFORMATION | | | | | | | | | | | | | | |
|---|---|---|---|---|---|---|---|---|---|---|---|---|---|---|
| NAME | ID | PROFILE | | | MOVING IMAGE VIEWING HISTORY | | | BETTING HISTORY | | WIN RECORD | | | NUMBER OF COINS HELD BY USER | USER'S BELONGING GROUP | FRIEND | |
| | | SEX | AGE | OCCUPATION | VIEWING DATE | MOVING IMAGE ID | BANDWAGON BET | BETTING DATE | BETTING ID | WIN AMOUNT | WIN RATE | NUMBER OF WINS | NUMBER OF VICTORIES | | | WHETHER FRIEND EXISTS | FRIEND ID |

INFORMATION PROCESSING DEVICE THAT DELIVERS MOVING IMAGE ON BET, INFORMATION PROCESSING METHOD FOR DELIVERING MOVING IMAGE ON BET, AND INFORMATION PROCESSING SYSTEM FOR DELIVERING MOVING IMAGE ON BET

TECHNICAL FIELD

The present invention relates to an information processing device, information processing method, and program.

BACKGROUND ART

A user can post a moving image through a network and view a moving image posted by another user. Nowadays, techniques such as a technique of automatically sorting a vast number of moving images and causing a user to select a moving image to be delivered out of the moving images of a predetermined sort and a technique of enabling extraction and delivery of a moving image that a viewer is highly likely to be interested in and concerned with are developed (see PTLs 1 and 2).

CITATION LIST

Patent Literature

PTL 1: International Patent Application Publication No. WO2011/126134
PTL 2: JP-A-2002-320214

SUMMARY OF INVENTION

Technical Problem

An example of the moving image to be delivered includes moving image contents on a bet (betting) made by predicting an outcome of a predetermined competition. In the case of delivering such moving images to the user, for example, it is preferable to deliver them to the user more effectively, and such needs becomes stronger as the number of moving images posted increases.

Against this background, the present invention aims to provide an information processing device, information processing method, and program capable of more effectively delivering, to a user, a moving image on a bet made by predicting an outcome of a predetermined competition.

Solution to Problem

An information processing device according to an aspect of the present invention is an information processing device that is configured to deliver, to a user, a moving image on a bet made by predicting an outcome of a predetermined competition, the information processing device including: a selection unit that is configured to select, out of multiple moving images, a part of moving images as a delivery candidate moving image based on a predetermined criterion; and a list sending unit that is configured to send the user a list indicating the delivery candidate moving image thus selected.

Meanwhile, an information processing device according to an aspect of the present invention is an information processing device that is configured to deliver, to a user terminal, a moving image on a bet made by predicting an outcome of a predetermined competition, the information processing device including a processor, in which the processor identifies user identification information associated with the user terminal, the processor selects, out of multiple moving images, a part of moving images as a delivery candidate moving image based on a criterion set according to the user identification information, the processor displays, on a display unit of the user terminal, a list indicating the delivery candidate moving image thus selected, and the processor displays, on the display unit of the user terminal, one of the moving images selected out of the delivery candidate moving image included in the list.

Advantageous Effects of Invention

The aspect of the present invention delivers a betting related moving image by selecting, out of multiple moving images, a part of moving images as a delivery candidate moving image in accordance with a predetermined criterion and presenting it to the user. Thereby, it is possible to deliver the moving image to the user effectively.

BRIEF DESCRIPTION OF DRAWINGS

FIG. 4 is an explanatory diagram of user related information.
FIG. 5 is an explanatory diagram of moving image related information.
FIG. 6 is an explanatory diagram of betting related information.
FIG. 7 is an explanatory diagram of race related information.
FIG. 8 is an explanatory diagram of win outcome information.
FIG. 12 is a diagram illustrating a flow of selection processing in an embodiment of the present invention.
FIG. 13 is an explanatory diagram of terminal information.
FIG. 14 is a diagram illustrating another example of user related information.

DESCRIPTION OF EMBODIMENTS

Figure 1:
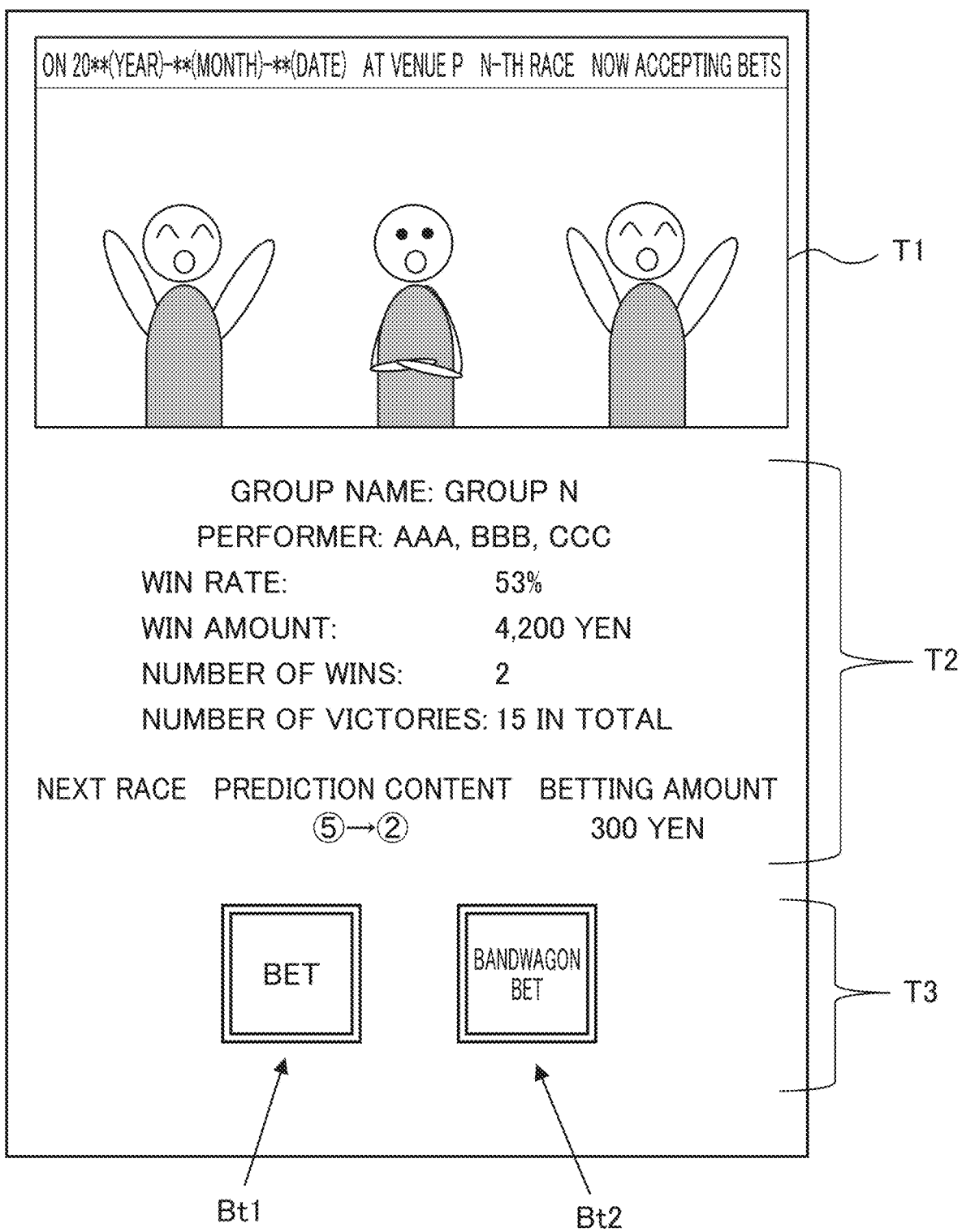
FIG. 1 is a diagram illustrating a screen for displaying a moving image related to betting.

Hereinbelow, an information processing device, information processing method, and program according to the present invention are described in detail while referring to specific embodiments (first to fourth embodiments).

Note that, the embodiments to be described below are merely an example for facilitating understanding of the present invention, and are not to limit the present invention. In other words, changes or modifications can be made from the embodiments to be described below without departing from the gist of the present invention, and the present invention includes equivalents thereof.

Screen examples which are illustrated in the drawings referred in the following description are also merely an example, and things such as screen configuration examples, information content to be displayed, and Graphical User Interfaces (GUIs) can be designed freely, or can be changed as appropriate, according to the specification of system design, the user's preference, and the like.

In this description, a "device" shall include not only a single device that exhibits a predetermined function by itself, but also multiple devices that are located away from each other but operate in cooperation with each other for exhibiting a predetermined function.

In this description, a "user" indicates a user of the information processing device of the present invention, concretely a user of service to be provided by the information processing device of the present invention, and more specifically a person who can be a potential delivery target of a moving image to be delivered by the information processing device of the present invention. Note that, while the user is an individual unless otherwise noted, the user is a unit to which a user account of moving image delivery service is allocated and may be a group of multiple persons.

Regarding Moving Image to be Delivered in Present Invention

Prior to a description of the present invention, a moving image to be delivered in the present invention is described.

A moving image to be delivered in the present invention is delivered to the user via a network such as the Internet or a mobile communication network through a communication line network, and delivered in real time (live delivery) via streaming, for example. However, the present invention is not limited thereto and is also applicable to the case where a taken (recorded) moving image is downloaded and reproduced.

In the present invention, a moving image is delivered as data converted into a predetermined file format. Note that, publicly-known techniques can be used as specific means for moving image shooting (recording), data conversion, and data delivery, and thus a description therefor is omitted.

In the present invention, a "betting support moving image" is delivered as a moving image. The betting support moving image is a moving image on a bet made by predicting the outcome of a predetermined competition, and is delivered to support user's betting. Specifically, at least one performer appears in the betting support moving image. During shooting of the moving image, the performer predicts the outcome of the predetermined competition before the predetermined competition starts, actually makes a bet, and checks whether or not his/her prediction is right while watching the predetermined competition on TV, for example. The user can view the betting support moving image and use it as a reference when the user himself/herself makes a bet.

For example, a "predetermined competition" indicates a competition such that one makes a bet by predicting its outcome, and can receive dividends (payout) if the bet is won, that is, a public competition (race), and concrete examples thereof include a horse race, a bicycle race, a boat race, and a motorcycle race. Betting includes not only paying a betting amount to purchase a betting ticket, but also paying virtual money (betting value), which is usable in a betting app to be described later for example, to make a bet.

Note that, the predetermined competition is not limited to a public competition, and also includes any competition such that the user can make a bet by predicting its outcome. The predetermined competition may include, for example, a dog race, sports matches for which one can make a bet such as a rugby match, a baseball match, a basketball match, and a soccer match, and may also include game contests such as so-called an E-sports contest and other competitions in which competitors fight for victory.

In this description, races shall be held on a regular basis according to a schedule—shall be held every day for example—and the betting support moving image is delivered with its content changed on a daily basis. To put it more concretely, the betting support moving image for a certain day is a moving image in which performer's conversations, performances, and the like regarding the race held on this day are taken, and this moving image can be delivered and viewed only on this day. Note that, races do not necessarily have to be held every day, and may be held every few days, every one week, every few weeks, every one month or every few months, or alternatively may be held on an irregular basis.

In addition, races are held repetitively in a predetermined period—held multiple times in one day for example—and the user can make a bet on each race held in one day. To put it more specifically, time slots for holding a race (predetermined competition) and time slots for accepting bets iterate in one day. During each bet accepting time slot, the user can make a bet on the corresponding race, more concretely on the race to be held right after this bet accepting time slot. In the betting support moving image, the performer makes a bet at least twice in one day.

Note that, the predetermined period is not limited to one day, and may be one to several hours, several days, one to several weeks, one to several months, or one to several years. In addition, the number of races held in the predetermined period may be only once, and in this case, the user can make a bet on the race held once in the predetermined period.

Multiple betting support moving images are deliverable every day, and different performers appear in the respective betting support moving images. In each betting support moving image, at least one performer appears. For example, as illustrated in FIG. 1, multiple performers constitute a group, and the betting support moving image is taken and delivered on a group basis. Note that, members of the group that appear in the betting support moving image (performers that belong to the group) may predict the race outcome together and make bets on the same content, or alternatively the members may make bets on different contents.

Meanwhile, all the multiple betting support moving images delivered on the same day are moving images on the race(s) held on this day (the predetermined competition(s) held on this day), to put it more strictly, moving images that deal with betting on the race (s). The user can view at least one of the multiple betting support moving images delivered on a certain day, and make a bet by predicting the outcome of the race(s) held on this day while referring to the behavior of the performer (more specifically the performer group) of the moving image that the user has viewed.

In addition, in the betting support moving image, as illustrated in FIG. 1, the content of betting that the performer of the moving image has made on this day (i.e., moving image delivery date) and information on bets won are displayed together. Concretely, the betting content, the betting amount, the number of wins, the win rate, the win amount, the number of victories, and the like are displayed. The user can refer to the above displayed information while viewing the betting support moving image, and make a bet on the same prediction content as the bet made by the performer of the moving image that the user is viewing (i.e., a bandwagon bet), for example.

Note that, the "betting content" indicates the content of prediction of betting, more concretely the content of prediction of the order of finish in the race. More specifically, the type of betting such as the perfecta, the trifecta, and the trio, and a combination of competitors in the predicted order of finish according to the type correspond to the betting content. Note that, the competitors of the race for which the order of finish is predicted may be a combination of a human and a vehicle/conveyance (such as a horse, a bicycle, a motorcycle, or a boat).

The "betting amount" indicates the amount of money bet (including the amount of money bet using virtual money).

The "number of wins" indicates the number of bets won in one race, and indicates the number of bets won in the latest race for example. Note that, when multiple races are held in one day, the "number of wins" may indicate a total number of bets won up to this time on the day.

The "win rate" indicates the rate of the number of bets won in a predetermined period and, when multiple races are held in one day, indicates the win rate up to this time on the day for example. Note that, the performer of the betting support moving image may calculate the win rate based on a total number of bets made during delivery of the moving images including the moving images having been delivered in the past and the number of bets won.

The "win amount" indicates dividends (payout) for the bets won in one race, and indicates dividends acquired in the latest race for example. Note that, when multiple races are held in one day, the "win amount" may indicate a total win amount acquired up to this time on the day.

The "number of victories" indicates the number of races won and, when multiple races are held in one day, indicates a total number of races won up to this time on the day. Note that, the "number of victories" may indicate a total number (cumulative total) of races the performer of the betting support moving image has won during delivery of the moving images including the moving images having been delivered in the past.

Meanwhile, the betting support moving image is viewable with dedicated application software (hereinafter a betting app). In other words, the betting app is installed in a terminal of the user (hereinafter a user terminal), and the user terminal receives and extracts delivery data of the betting support moving image when the user performs a predetermined operation after booting the app. As a result, the betting support moving image is displayed on a display (display unit) of the user terminal.

Regarding Information Processing Device and User Terminal of First Embodiment

An information processing device (hereinafter an information processing device 10) according to a first embodiment of the present invention and a user terminal (hereinafter a user terminal 12) used by the user are described.

In the following description, a "viewer" indicates the user viewing, or having viewed, the betting support moving image. In addition, for the sake of facilitating understanding, the following description is given on the assumption that the betting support moving image is delivered to one user (hereinafter a user γ). However, the present invention is also applicable to the case where the betting support moving image is delivered to multiple users.

The information processing device 10 is implemented by a server computer (corresponding to an example of a computer) The information processing device is configured to deliver the betting support moving image to the user γ, specifically, configured to communicate with the user terminal 12 used by the user γ and execute information processing for delivering the betting support moving image. The server computer constituting the information processing device 10 may be a single computer or alternatively multiple parallel distributed computers. In addition, the above server computer may be a server computer for an Application Service Provider (ASP), Software as a Service (SaaS), Platform as a Service (PaaS), or Infrastructure as a Service (IaaS).

Figure 2:
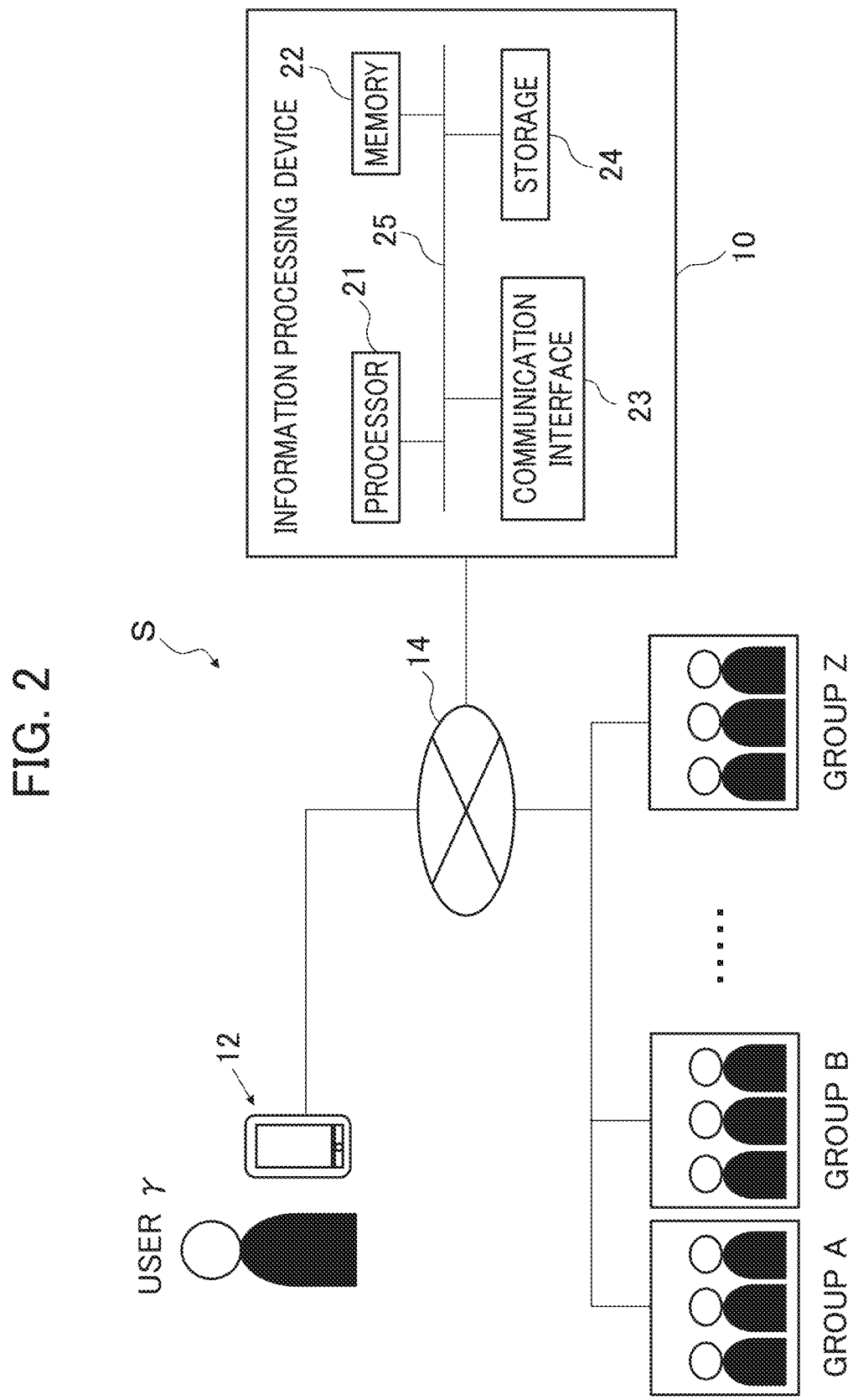
FIG. 2 is a diagram illustrating an information processing device and a user terminal according to an embodiment of the present invention.

As illustrated in FIG. 2, the information processing device 10 and the user terminal 12 of the user γ are connected to each other via a communication line network 14 so as to be capable of communicating with each other, and constitute an information processing system S in cooperation with each other. The communication line network 14 may include a network such as a Local Area Network (LAN), Wide Area Network (WAN), intranet, and Ethernet (registered trademark).

In the information processing system S, the server computer constituting the information processing device 10 delivers moving images, and also executes a series of information processing (excluding input and display of information) related to the present invention. On the user terminal 12 side, input of information to be passed to the server computer and output (such as display and reproduction) of information delivered from the server computer are performed.

The information processing device 10 acquires betting support moving images posted by multiple groups, analyzes each of the moving images, and delivers betting support moving image(s) satisfying predetermined conditions to the user γ based on the analysis result. In addition, the information processing device 10 accepts bets on a race made by the user through the betting app, acquires the race outcome, and determines whether or not the prediction of each of the accepted bets is right. Further, for each of the accepted bets, the information processing device 10 calculates the number of wins, the number of victories, the win amount, and the win rate (hereinafter the number of wins etc.) based on the result of the determination on whether or not the bet is won. Furthermore, the information processing device 10 delivers information on the number of wins etc., having been calculated for each performer of the betting support moving image, to the user γ together with the betting support moving image.

The user terminal 12 of the user γ is implemented by a terminal such as a personal computer, a smartphone, a mobile phone, a tablet terminal, or another terminal having a communication function, and is used when the user γ views the betting support moving image delivered by the information processing device 10 and when the user predicts the race outcome and makes a bet.

To put it more concretely, the user terminal 12 receives, through the installed betting app, data sent from the information processing device 10, extracts the data, and displays various kinds of information on the display (corresponding to the display unit) of the user terminal 12. The data sent from the information processing device 10 includes the betting support moving image and information on the performer of this moving image. The information on the performer of the moving image includes information such as the profile of the performer (concretely each of group members that appears in the moving image), betting information on betting that the performer has made during delivery of the moving image (concretely the race as a betting target, the betting content, the betting amount, and so on), and the number of wins of the performer.

The display screen of the user terminal 12 observed when the app is on is described with reference to FIG. 1. The betting support moving image is displayed in an upper area T1 of the display. Meanwhile, in addition to the display of the betting support moving image, information on the performer of the betting support moving image is displayed in a central area T2 different from the upper area T1. The information displayed in the central area T2 is information associated with the betting support moving image displayed in the upper area T1, and includes betting information. In this way, the betting support moving image and the betting information are displayed at the same time (in one screen).

Meanwhile, a bet button Bt1 is displayed in a lower area T3 located in the lowest part of the display. The user γ can make a bet on a race by clicking the bet button Bt1 and inputting the betting content in a betting screen (not illustrated). Here, the upper area T1 corresponds to a first display area in the display unit while the central area T2 and the lower area T3 correspond to a second display area in the display unit. Note that, instead of the bet button Bt1, it is also possible to display input columns for the betting content in the lower area T3.

When the performer of the betting support moving image predicts the outcome of the next race (a race to be held right after betting, for example) and makes a bet during delivery of the moving image, betting information such as his/her prediction content and betting amount is displayed in the central area T2. In this event, a bandwagon bet button Bt2 is displayed in the lower area T3. In this case, by clicking the bandwagon bet button Bt2, the user γ can make a bet on the same prediction content as the bet made by the performer of the betting support moving image that the user is viewing, that is, a bandwagon bet.

Note that, after the race is over, information on the race outcome and the like is displayed on the user terminal 12 in a screen different from the screen of FIG. 1. Thereby, the user γ can check whether or not the bet made by himself/herself is won, the win amount (payout) to be paid when the bet is won, and the like.

Configuration of Information Processing Device

Next, the configuration of the information processing device 10 is described.

As illustrated in FIG. 2, the server computer constituting the information processing device 10 has, as hardware devices: a processor 21; a memory 22; a communication interface 23; and a storage 24, and these devices are electrically connected to each other via a bus 25.

In addition, in the above server computer, an operating system (OS) program and an application program for moving image delivery are installed as software. These programs correspond to a "program" of the present invention. The processor 21 operates in accordance with the above programs, which causes the server computer to function as the information processing device of the present invention and execute a series of processing related to the present invention.

Note that, the above programs may be acquired by retrieving them from a computer-readable recording medium (medium) or alternatively may be acquired by receiving (downloading) them via a network such as the Internet or intranet.

The processor 21 may be implemented by a Central Processing Unit (CPU), a Micro-Processing Unit (MPU), a Micro Controller Unit (MCU), a Graphics Processing Unit (GPU), a Digital Signal Processor (DSP), a Tensor Processing Unit (TPU), an Application Specific Integrated Circuit (ASIC), or the like.

The memory 22 may be implemented by a semiconductor memory such as a Read Only Memory (ROM) and a Random Access Memory (RAM).

The communication interface 23 may be implemented by a network interface card, a communication interface board, or the like, for example. The data communication standard employed by the communication interface 23 is not particularly limited, and includes wireless LAN communication based on Wi-fi (registered trademark), communication by any of 3G to 5G or later generation mobile communication system, communication based on Long Term Evolution (LTE), and the like.

The storage 24 may be implemented by a flash memory, a Hard Disc Drive (HDD), a Solid State Drive (SSD), a Flexible Disc (FD), a Magneto-Optical disc (MO disc), a Compact Disc (CD), a Digital Versatile Disc (DVD), a Secure Digital card (SD card), a Universal Serial Bus memory (USB memory), or the like. In addition, the storage 24 may be embedded in a chassis of the server computer constituting the information processing device, or alternatively may be externally mounted on the server computer. Still alternatively, the storage 24 may be implemented by an external computer (e.g., database server) connected to the server computer so as to be capable of communicating with each other. Note that, as a technique of recording various kinds of data, a distributed ledger technique such as blockchain may be used for the purpose of preventing illegal data alteration and the like.

The configuration of the information processing device 10 is further described in terms of functional aspects. The information processing device 10 has functional units illustrated in FIG. 3, that is: a moving image acquisition unit 31; a betting acquisition unit 32; an outcome acquisition unit 33; a storage unit 34; an update unit 35; a selection unit 36; a list sending unit 37; and a moving image delivery unit 38. Among these functional units, the storage unit 34 is implemented by the memory 22 or the storage 24, and other functional units are implemented in such a way that various hardware devices, including the processor 21, of the server computer constituting the information processing device 10 and the programs installed in the server computer operate in cooperation with each other. Hereinbelow, each of these functional units is described in detail.

The moving image acquisition unit 31 is configured to acquire the posted betting support moving images on a group basis (i.e., for each performer group). Note that, in the first embodiment, the betting support moving image is delivered live, and thus the moving image acquisition unit 31 acquires, in real time (more strictly including delay time occurring during data communication), the betting support moving image being taken.

The betting support moving image is posted with information such as the ID and delivery date of this moving image embedded therein, and is associated with information on the performer of the moving image (concretely the performer group and its members). The information on the performer includes attributes (categories) of the performer, more concretely includes the sex, age, occupation, and the like of each member of the performer group. The attributes (categories) of the performer may be determined by the performer himself/herself, or alternatively may be determined by the information processing device 10 in accordance with a predetermined rule.

The betting acquisition unit 32 is configured to acquire, when the user makes a bet on a race, information on the bet from the user terminal 12 through which the bet is made. In other words, the betting acquisition unit 32 is configured to accept bets by receiving, from the user terminal 12, the betting content (concretely the prediction content, the betting amount, and the like) that the user has input through the user terminal 12. Besides the user γ, the user who makes a bet includes the performer of the betting support moving image, viewers of the betting support moving images being delivered or having been delivered in the past, and so on. Note that, in the first embodiment, races are held multiple times in one day, and bets are accepted during bet accepting time slots that are set between the races. During each bet accepting time slot, the betting acquisition unit 32 acquires information on a bet for a race to be held right after this bet accepting time slot.

In addition, on the display of the user terminal 12 of the user γ, the betting support moving image and the betting information associated with the betting support moving image are displayed together (in one screen). Thereby, the user γ can make a bet based on the betting information while viewing the betting support moving image. The betting information associated with the betting support moving image indicates information on a bet made by the performer of this moving image, more concretely the prediction content, the betting amount, and the like for the bet.

Then, the betting acquisition unit 32 accepts a bet of the user γ based on the betting information through the user terminal 12 of the user γ. In other words, the betting acquisition unit 32 can accept the bet of the user γ by receiving, from the user terminal 12, the betting content that the user γ inputs through the user terminal 12 while the betting support moving image and the betting information are displayed together on the display.

The outcome acquisition unit 33 is configured to acquire, when each race is over, information on the outcome of the race. The information on the outcome of the race includes: a race ID; the order of finish of the competitors joining the race; information on dividends according to the race outcome (concretely odds); and other information on the race outcome.

Figure 3:
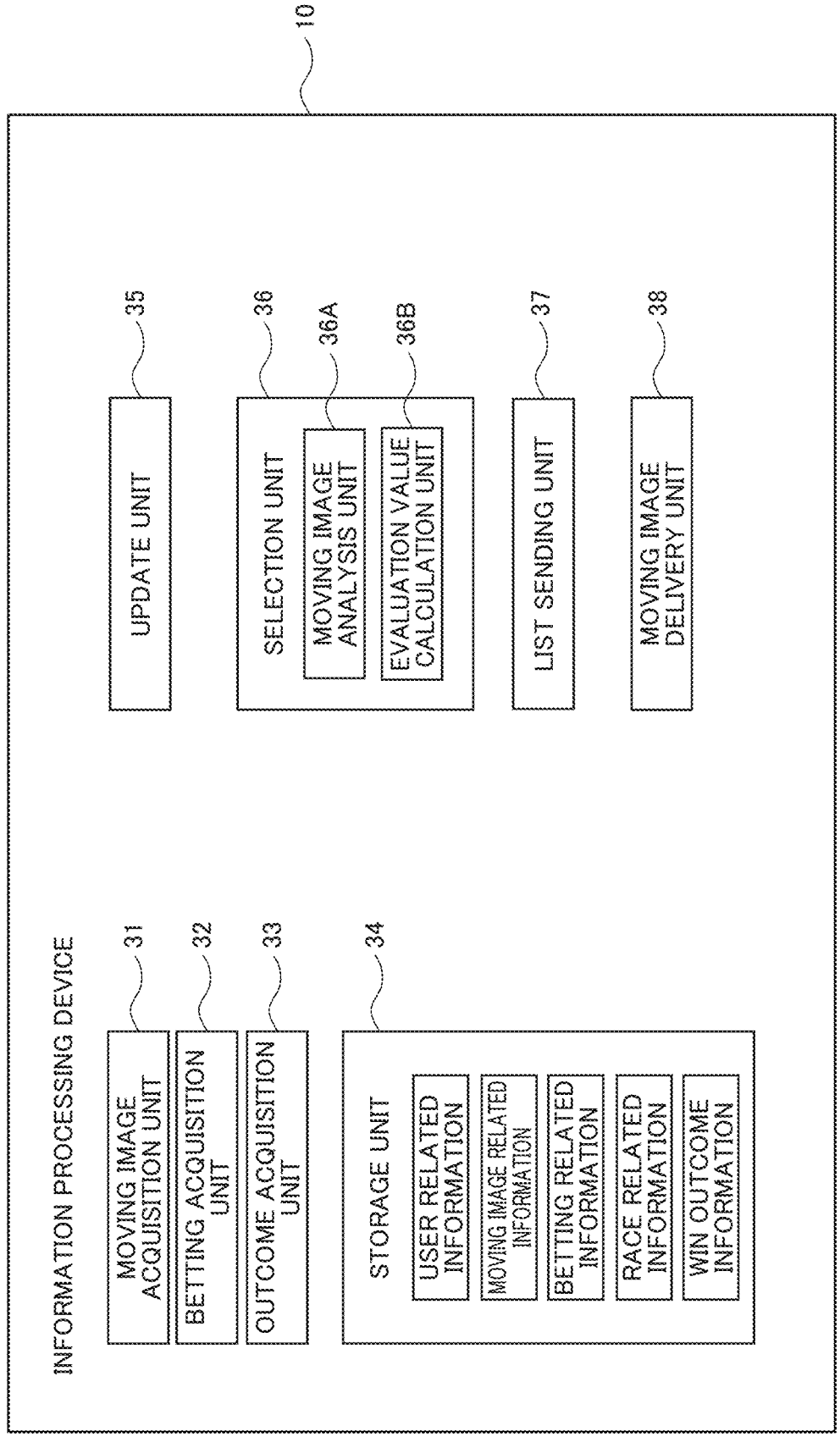
FIG. 3 is a diagram illustrating functions of the information processing device according to the embodiment of the present invention.

The storage unit 34 is configured to store various kinds of information necessary for information processing, including delivery of the betting support moving image, performed by the information processing device 10. As illustrated in FIG. 3, the information stored in the storage unit 34 includes: user related information; moving image related information; betting related information; race related information; and win outcome information.

The user related information is information on the user including the performer and viewer of the betting support moving image, and is stored on per user basis. As illustrated in FIG. 4, the user related information includes information such as: a user's name; a user ID corresponding to user identification information; a profile; viewing history information; betting history information; win record information; the number of game coins held by the user; and a user's belonging group.

The profile is information on the attributes (categories) of the user, and is information such as the sex, age, and occupation.

The viewing history information is information on the situation where the moving image is viewed, and more concretely is information such as the viewing date of each betting support moving image that the user has viewed, the ID of the moving image, and whether or not the user has made a bandwagon bet while viewing the moving image.

The betting history information is information such as the date of each bet that the user has made and the ID of the bet.

The win record information is information indicating the win record of prediction about each bet that the user has made, and concretely includes, for example, the win amount that has been acquired in the immediately preceding race, and the win rate, the number of wins, the win amount, and the number of victories on the day when the race is held.

The user's belonging group is information indicating a performer group that the user belongs to when the user is the performer of the betting support moving image.

The moving image related information is information on the betting support moving image posted, and is stored on per moving image basis. As illustrated in FIG. 5, the moving image related information includes information such as: a moving image ID; delivery date; the name of a group that appears in the moving image; performer information; an attribute (category); target race information; and an evaluation value.

The performer information is information on the group that appears in the moving image and its members, and concretely includes information such as the ID (user ID) of each member, the betting amount of a bet that the member has made on a race held on the moving image delivery date, and his/her number of victories, number of wins, win amount, and win rate on the moving image delivery date.

The attribute (category) is information on the attributes (categories) of a group that appears in the moving image, and is determined according to the attributes (such as the sex, age, and occupation) of the member of the group.

The target race information is information on a race for which a race outcome is predicted in the betting support moving image (hereinafter a target race), and is information such as the ID of the target race, date when the target race is held, and its venue.

The evaluation value is an evaluation value (score) to be given to the betting support moving image through moving image analysis executed by the information processing device 10. The evaluation value is to be described later in detail.

The betting related information is information on a bet made by the user, and is stored on per bet basis. As illustrated in FIG. 6, the betting related information includes information such as: a betting ID; the ID of the user having made the bet; a race ID about the bet; the date when and location where the race was performed (held); a betting type; the prediction content (i.e., the order of finish predicted); a betting amount; a payout ratio (odds) in the case where the bet is won; and betting time. In addition, when the user makes a bandwagon bet, the betting related information also includes information such as information for identifying the betting support moving image that the user was viewing at the time of making this bandwagon bet (hereinafter the source moving image), more concretely the ID of the source moving image.

The race related information is information on a race, and is stored on per race basis. As illustrated in FIG. 7, the race related information includes information such as: a race ID; an event; the grade (grading) of the race; the date when the race is held; a venue; competitor information; and betting candidate information. For example, the race event corresponds to a competition event such as a motorcycle race or a bicycle race. The betting candidate information is information on prediction candidates about the order of finish in the race and, as illustrated in FIG. 7, includes information such as: a candidate ID; the betting content (concretely the content on the predicted order of finish); and odds.

The win outcome information is information indicating a win outcome with regard to the race outcome that the user has predicted at the time of betting, and is stored on per bet basis. As illustrated in FIG. 8, the win outcome information includes information such as: a betting ID; the ID of the user having made the bet; the ID of a race as a betting target; whether or not the bet is won; the amount of dividends acquired when the bet is won (win amount); and due date for the payment of the dividends (payout due date).

The update unit 35 is configured to update as needed information stored in the storage unit 34. For example, when the moving image acquisition unit 31 acquires a new betting support moving image, the update unit 35 adds, in the storage unit 34, moving image related information on the betting support moving image newly acquired. In addition, when the outcome acquisition unit 33 acquires information on the race outcome for a certain race, the update unit 35 retrieves, from the storage unit 34, the betting related information on bets made for the above race, and determines, for each of the bets, whether or not the bet is won based on the information acquired by the outcome acquisition unit 33. Further, the update unit 35 updates the win outcome information and the user related information based on this determination result, and updates information such as the number of victories, the number of wins, and the win amount of the user whose bet was won, for example.

The selection unit 36 is configured to select, when multiple betting support moving images are posted and acquired by the moving image acquisition unit 31, a part of the multiple betting support moving images as a delivery candidate moving image based on a predetermined criterion. The delivery candidate moving image is a candidate for the betting support moving image to be delivered to the user γ, and three moving images are selected as the delivery candidate moving images in the first embodiment, for example. Note that, the number of betting support moving images to be selected as the delivery candidate moving images is not particularly limited as long as at least one moving image is selected.

The predetermined criterion is a criterion (conditions) for selecting the delivery candidate moving image. For example, the criterion is set for an evaluation result at the time of evaluating each of the multiple betting support moving images. In other words, the selection unit 36 selects the delivery candidate moving image according to the evaluation result of each of the moving images. In particular, in the first embodiment, the selection unit 36 calculates an evaluation value for each of the betting support moving images, and selects the delivery candidate moving image according to the magnitude of the evaluation value.

To put it more concretely, as illustrated in FIG. 3, the selection unit 36 has an analysis unit 36A and an evaluation value calculation unit 36B. The analysis unit 36A is configured to analyze each of the multiple betting support moving images acquired by the moving image acquisition unit 31 (more strictly the betting support moving images being taken in real time) based on audio and images (videos) in the moving image and various kinds of information stored in the storage unit 34. In the first embodiment, the analysis unit 36A analyzes each of the betting support moving images from the perspective of: the enthusiasm degree of the performer in the moving image; the situation of bets that the performer has made for a race held on the moving image delivery date; and the magnitude of viewers supporting the performer. The enthusiasm degree is identified according to the behavior, facial expression, and the like of the performer, for example. The betting situation is identified according to the betting amount, the win outcome, and the like, for example. The magnitude of viewers corresponds to the number of viewers having made a bandwagon bet, and the like, for example.

Note that, in the first embodiment, races are held multiple times in one day (predetermined period). Once bets for each race are made, the update unit 35 updates information, stored in the storage unit 34, in one day as needed. In conjunction with this, the analysis unit 36A analyzes the betting support moving image and updates the analysis result every time a race is held in one day.

The evaluation value calculation unit 36B is configured to evaluate each of the multiple betting support moving images, more concretely calculate an evaluation value for each of the betting support moving images according to the result of analysis made by the analysis unit 36A. In the first embodiment, the evaluation value calculation unit 36B calculates the evaluation value for each of the betting support moving images from the three perspectives described above. In the first embodiment, as described previously, the analysis result of each of the betting support moving images is updated as needed in one day (predetermined period). Once the analysis result is updated, the evaluation value calculation unit 36B recalculates the evaluation value for each of the betting support moving images based on the analysis result thus updated.

Then, the selection unit 36 selects the delivery candidate moving image according to the evaluation result of each of the betting support moving images (i.e., evaluation value), more concretely selects top three betting support moving images in the ascending order of the evaluation value.

Figure 9:
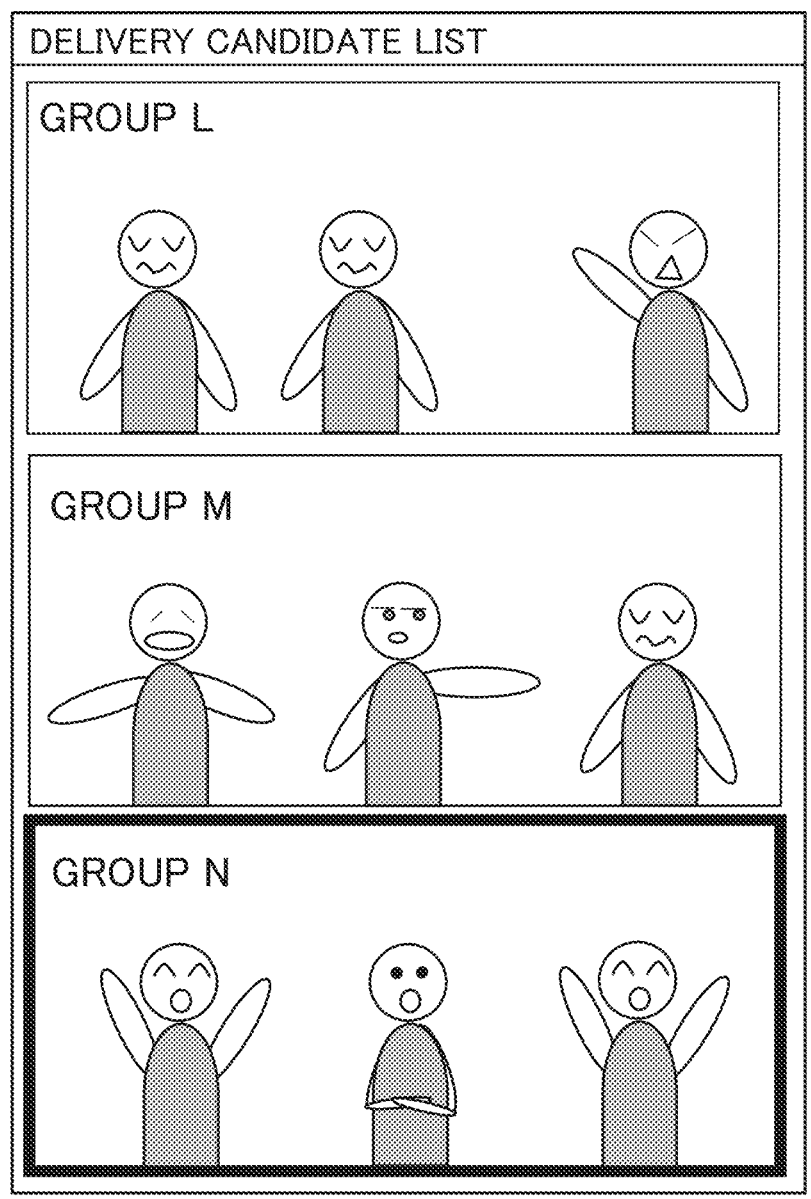
FIG. 9 is a diagram illustrating a screen for displaying a delivery candidate list.

The list sending unit 37 is configured to send the user γ a list indicating the delivery candidate moving images selected by the selection unit 36 (that is, the betting support moving images ranked first to third highest in terms of evaluation value). To put it more concretely, the list sending unit 37 retrieves information (such as the moving image related information and the user related information), stored in the storage unit 34, with regard to the betting support moving images selected as the delivery candidate moving images. The list sending unit 37 creates list display data based on the information thus retrieved. The list display data thus created is sent to the user terminal 12 of the user γ, and the user terminal 12 of the user γ receives and then extracts the list display data. Thereby, a delivery candidate list illustrated in FIG. 9 is displayed on the display of the user terminal 12 of the user γ. In other words, the list sending unit 37 displays the delivery candidate list on the display (display unit) of the user terminal 12.

In the delivery candidate list, image information on each of the three delivery candidate moving images thus selected is displayed selectably. The image information on the moving image may be a thumbnail image created based on a part of the delivery candidate moving image (concretely a frame image), or alternatively may be a photograph of the face of the performer of the delivery candidate moving image, for example. The user γ selects one of the delivery candidate moving images, and touches image information of the moving image selected in the displayed delivery candidate list.

In the delivery candidate list, the layout position of each of the three delivery candidate moving images thus selected may be set according to the level of the evaluation value. To put it more specifically, the priority according to the evaluation value is set for each of the three delivery candidate moving images thus selected. Then, when displaying the delivery candidate list on the display of the user terminal 12, the list sending unit 37 (i.e., the processor) arranges the delivery candidate moving images in the order of priority of these moving images. Concretely, for example, the three delivery candidate moving images are arranged in the delivery candidate list so that the moving image having higher priority may be located on the further upper side of the list. Note that, how to set the priority, that is, the setting criterion at the time of setting the priority is not particularly limited.

The moving image delivery unit 38 is configured to deliver (specifically deliver in real time), to the user terminal 12 of the user γ, the betting support moving image selected by the user γ out of the delivery candidate moving images displayed in the delivery candidate list. The betting support moving image thus delivered is displayed on the display of the user terminal 12. Thereby, out of the multiple betting support moving images posted, the user γ can view the moving image having a high evaluation value and being selected by the user γ himself/herself.

As described above, the moving image delivery unit 38 displays, on the display (display unit) of the user terminal 12, one betting support moving image selected out of the delivery candidate moving images included in the delivery candidate list. In this event, the moving image delivery unit 38 displays the betting support moving image in the upper area T1 of the display, and displays betting information associated with the above moving image in the central area T2 of the display (see FIG. 1).

Regarding Information Processing Method According to First Embodiment

Next, the flow of information processing for delivering the betting support moving image to the user γ using the information processing device 10 (hereinafter the moving image delivery flow) is described as an example of the information processing method of the present invention. The moving image delivery flow employs the information processing method of the present invention. In other words, steps in the moving image delivery flow correspond to constituents of the information processing method of the present invention.

Note that, the flow to be described below is merely one example, and thus unnecessary steps may be deleted from and new steps may be added to this flow, and steps may be executed in a different order without departing from the gist of the present invention.

In addition, the following description is given while assuming a case where races are held multiple times on a certain day (hereinafter the race day), and the betting support moving image delivered in real time on the race day is delivered to the user γ. In this case, the performer (specifically the performer group) of the betting support moving image shall predict the race outcome and make a bet on each of the races held multiple times on the race day.

Figure 10:
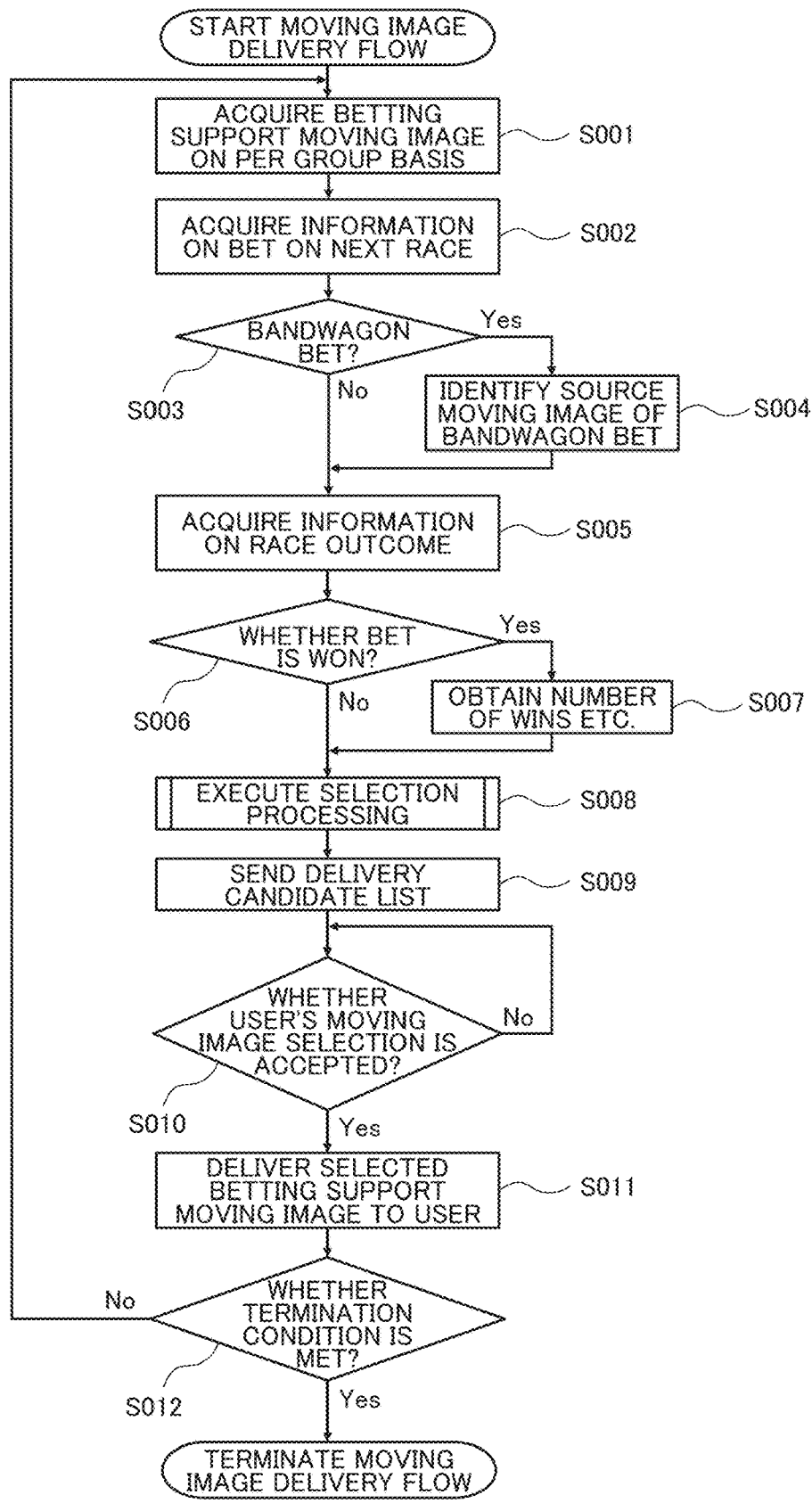
FIG. 10 is a diagram illustrating an information processing flow using the information processing device according to the embodiment of the present invention.

The moving image delivery flow proceeds along a flow illustrated in FIG. 10, and steps in this flow are executed mainly by the processor of the server computer constituting the information processing device 10 (hereinafter simply referred to as the processor). Here, causing the processor to execute the steps is equivalent to causing the server computer constituting the information processing device 10 (computer) to execute the steps.

The moving image delivery flow is described. When the predetermined time arrives on the race day, multiple performer groups (hereinafter groups A to Z) each start taking and posting the betting support moving image. The betting support moving images posted on per group basis correspond to multiple moving images. The processor acquires the betting support moving images on per group basis (S001).

In addition, during each bet accepting time slot (i.e., time slot between races) on the race day, each of the multiple users including the performer of the betting support moving image predicts the outcome of the next race, that is, a race to be held right after this bet accepting time slot, and makes a bet according to this prediction content. The processor acquires information on the bets made by the users (S002). In this event, the processor determines whether or not each of the bets is a bandwagon bet, and identifies the source moving image if the bet is a bandwagon bet (S003, S004).

The processor acquires information on the race outcome after each race is over (S005), determines whether or not each of the bets made during the immediately preceding bet accepting time slot is won, and obtains the number of wins and the like for each of the bets won (S006, S007). In this event, for example, the processor obtains the number of wins and the like of each of the performers of the betting support moving image, more concretely each of the groups A to Z.

Meanwhile, the processor executes selection processing once Step S001 starts (i.e., once starting to acquire the betting support moving images) (S008). In the selection processing, the processor selects, out of the betting support moving images acquired on per group basis, a predetermined number (concretely three) of moving images as the delivery candidate moving images.

After executing the selection processing, the processor sends the user γ a list indicating the delivery candidate moving images thus selected, that is, the delivery candidate list (S009). Concretely, the processor retrieves, from the storage unit 34, information on the betting support moving images selected as the delivery candidate moving images. Then, the processor creates list display data based on the retrieved information, and sends the list display data thus created to the user terminal 12 of the user γ. In the user terminal 12 of the user γ, the list display data is extracted and a delivery candidate list is displayed (see FIG. 9).

Then, the user γ selects one of the three betting support moving images listed in the delivery candidate list (that is, the moving image of one of the groups A to Z), and touches it on the list display screen. The processor accepts moving image selection by the user γ (S010). With this event as a trigger, the processor delivers, more specifically delivers in real time, the betting support moving image, selected by the user γ, to the user terminal 12 of the user γ (S011). In other words, the processor displays, on the display (display unit) of the user terminal 12, one of the betting support moving images selected out of the delivery candidate moving images included in the delivery candidate list.

The above series of Steps S001 to S011 is iterated until a predetermined termination condition is met. An example of the termination condition is an event where a final race ends on the race day or an event where the user γ stops the betting app in the user terminal 12 and ends viewing the betting support moving image. Then, once the termination condition is met, the moving image delivery flow for the race day is terminated.

Figure 11:
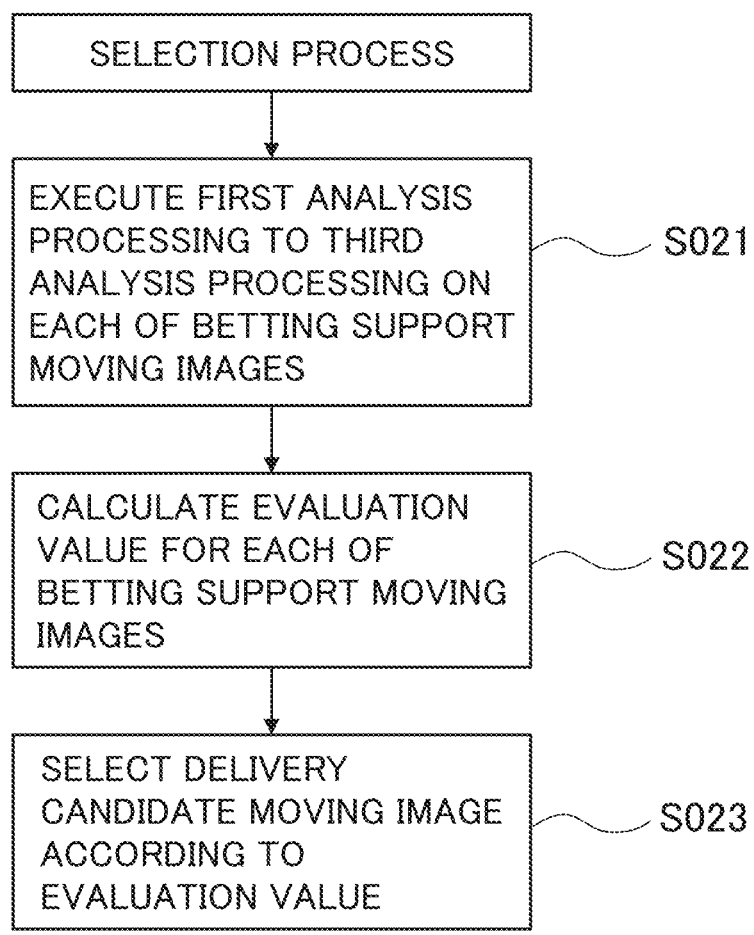
FIG. 11 is a diagram illustrating a flow of selection processing.

Next, a selection process in the moving image delivery flow is described in detail with reference to FIG. 11.

In the selection process, the processor executes analysis processing on each of the betting support moving images acquired on per group basis in Step S001, more concretely executes first analysis processing, second analysis processing, and third analysis processing thereon (S021).

In the first analysis processing, for each of the betting support moving images, the processor identifies the enthusiasm degree of the moving image based on at least one of a voice and an image of the performer in the moving image (i.e., each member of each of the groups A to Z), more concretely identifies the behavior of the performer. To put it more specifically, in the first analysis processing, the processor identifies the following (r1) to (r3) for each of the multiple betting support moving images.

(r1) the number of persons speaking in the moving image
(r2) the performer's speech content (topic)
(r3) the facial expression of the performer in the moving image The number of persons speaking in the moving image can be identified based on the voice of the performer in the moving image by using a publicly known speaker recognition technique such as a personal identification technique using voice patterns. Note that, the number of speaking persons may be identified using an image processing technique of analyzing mouth movements in the image of the performer, or alternatively may be identified based on both the voice and image of the performer.

The performer's speech content can be identified by converting the voice of the performer into a text (character information) based on audio in the moving image using voice recognition processing and natural language processing.

To identify the facial expression of the performer, the performer in the moving image is extracted using a publicly known object analysis algorithm such as Region-based CNN (R-CNN), Fast R-CNN, You only Look Once (YOLO), and Single Shot Multibox Detector (SDD). Then, based on the image of the performer thus extracted, the facial expression of the performer can be identified by applying a technique such as an image analysis technique for facial expression recognition in accordance with the FACS theory (Facial Action Coding System).

Note that, in the first analysis processing, it is more preferable to identify, on the race day, the enthusiasm degree (concretely the above items r1 to r3) during the bet accepting time slots that are set between the races.

In the second analysis processing, for each of the betting support moving images, the processor identifies information on bets that the performer (i.e., each member of each of the groups A to Z) has made on the race day, more concretely identifies information such as the betting amount and the win outcome. To put it more specifically, in the second analysis processing, the processor identifies the following (r11) to (r13) on per group basis for each of the multiple betting support moving images.

(r11) the number of wins and the like in the immediately preceding race on the race day
(r12) the number of consecutive times of bets won among multiple bets that the performer of the betting support moving image has made within the race day
(r13) variation in the betting amount among bets made on the race day The number of wins and the like in the immediately preceding race on the race day indicates a figure on bets of the performer of the moving image won in the immediately preceding race. The number of wins and the like is identified based on information stored in the storage unit 34, more concretely based on the performer's user related information, the betting related information, and the win outcome information of the betting support moving image at the time when the immediately preceding race is over.

The number of consecutive times of bets won within the race day is identified based on the moving image related information, the betting related information, and the win outcome information of the betting support moving image stored in the storage unit 34.

The variation in the betting amount on the race day indicates the amount of increase/decrease of the betting amount among bets made on races on the race day, and is identified based on the performer's user related information and the betting related information of the betting support moving image stored in the storage unit 34.

Note that, in the second analysis processing, instead of identifying the number of wins and the like in the immediately preceding race on the race day, it is also possible to identify an accumulative value of the number of wins and the like up to this time on the race day as well as identify the number of wins and the like in the immediately preceding race.

In the third analysis processing, for each of the betting support moving images, the processor identifies the magnitude of viewers supporting the performer, more concretely identifies the number of viewers having made a bandwagon bet while viewing the moving image on per group basis. The number of viewers having made a bandwagon bet is identified based on the moving image related information of the betting support moving image and the betting related information stored in the storage unit 34.

Note that, in the third analysis processing, instead of identifying the number of viewers having made a bandwagon bet while viewing the moving image, it is also possible to identify the number of viewers having made a bet while viewing the moving image irrespective of whether or not the bet has been made on the same prediction content as the bet made by the performer of the moving image.

After the analysis processing is over, the processor executes evaluation processing for evaluating each of the betting support moving images having been acquired on per group basis in Step S001 (S022). In the evaluation processing, for each of the betting support moving images, the processor calculates an evaluation value for the betting support moving image on per group basis based on the analysis result of the analysis processing.

A procedure of calculating an evaluation value based on the analysis result is described. When identifying the number of persons speaking in the moving image in the first analysis processing, the processor gives a higher evaluation value if the number of persons is more than one. Here, the evaluation value becomes the highest if the number of persons speaking is equal to the number of members in the group (i.e., three). However, without being limited thereto, the processor may adversely decrease an evaluation value if the number of persons speaking exceeds a predetermined number in the case where the number of members in the group is more than three (e.g., more than ten), for example.

In addition, when identifying the performer's speech content in the first analysis processing, the processor may give a higher evaluation value if this speech content contains a predetermined word, for example a positive word. In contrast, the processor may give a lower evaluation value if this speech content contains a negative word. Note that, positive words and negative words may be stored in the computer in advance as determination keywords.

Additionally, when identifying the facial expression of the performer in the first analysis processing, the processor gives a higher evaluation value if this facial expression is a predetermined facial expression, for example a positive facial expression such as a smile. In contrast, the processor gives a lower evaluation value if this facial expression is a negative facial expression such as an angry face and a crying face. Note that, positive facial expressions and negative facial expressions may be stored in the computer in advance as determination facial expression patterns.

Besides, when identifying the number of wins and the like in the immediately preceding race in the second analysis processing, the processor gives a higher evaluation value as the value of the number of wins and the like is larger. Further, when identifying the number of consecutive times of bets won in the second analysis processing, the processor gives a higher evaluation value as the number of consecutive times is larger. Furthermore, when identifying the variation in the betting amount, that is, the amount of increase/decrease of the betting amount in the second analysis processing, the processor gives a higher evaluation value as the amount of increase of the betting amount from the preceding race is larger.

In addition, when identifying the number of viewers having made a bandwagon bet while viewing the moving image in the third analysis processing, the processor gives a higher evaluation value as the number of viewers is larger.

Note that, when calculating an evaluation value, the processor may take into consideration a factor other than the analysis result in the analysis processing. For example, the processor may calculate an evaluation value according to the number of viewers of the betting support moving image up to this time, or alternatively an accumulative value of the number of viewers on the race day.

In the evaluation processing, the processor calculates an evaluation value in the above manner on per moving image basis (in other words, on per performer group basis). In this event, the processor may obtain a final evaluation value by calculating an evaluation value based on the analysis result in the first analysis processing, an evaluation value based on the analysis result in the second analysis processing, and an evaluation value based on the analysis result in the third analysis processing, respectively, and adding these three evaluation values. In this case, the processor may obtain a final evaluation value by setting a weight for each of evaluation values, multiplying each of these three evaluation values by the corresponding weight, and adding these products.

After the evaluation processing is over, according to the evaluation values thus calculated on per moving image basis, the processor selects a predetermined number (e.g., three) of delivery candidate moving images out of the multiple betting support moving images (S023). To put it more concretely, the processor selects a predetermined number of the betting support moving images as delivery candidate moving images in the ascending order of the evaluation value.

Note that, without being limited thereto, the processor may sort the multiple betting support moving images according to attributes (categories), and select, for each of the attributes, one of the betting support moving images having the highest evaluation value as a delivery candidate moving image. In this case, in the delivery candidate list to be sent to the user γ in the later process, information on the delivery candidate moving image (image information) may be displayed for each of the categories.

The selection processing is executed repetitively according to the above procedure during the race day, more specifically executed every time each race is held on the race day. In other words, every time each race is held during the race day, an evaluation value is calculated (updated) for each of the betting support moving images. Then, in response to the update of the evaluation values of the moving images, the delivery candidate moving images are selected again. As to the delivery candidate list to be sent to the user γ, a newly-created list may be sent every time the delivery candidate moving images are selected. Alternatively, the delivery candidate list may be sent only once after the user γ operates the user terminal 12 and boots the betting app. The delivery candidate list in this case shows the delivery candidate moving images having been selected immediately before the boot of the app.

Regarding Second Embodiment

In the first embodiment, the processor selects a predetermined number of the betting support moving images as the delivery candidate moving images in the ascending order of the evaluation value. However, without being limited thereto, the processor may select delivery candidate moving images not only based on the evaluation value but also according to the user γ who is a sending target of the delivery candidate list. In other words, the processor may execute the selection processing so that the delivery candidate moving images may differ from one user to another. This embodiment (hereinafter the second embodiment) is described with reference to FIG. 12. Note that, in the following description, the second embodiment is described mainly in terms of points different from the first embodiment.

A moving image delivery flow according to the second embodiment is almost the same as the moving image delivery flow according to the first embodiment. On the other hand, selection processing in the second embodiment (hereinafter the second selection processing) starts once the user γ boots the betting app on the user terminal 12.

In the second selection processing, first, the user ID associated with the user terminal 12 with the betting app booted is identified (S101). Concretely, the processor identifies the terminal ID of the user terminal 12 based on data sent from this user terminal 12. Then, the processor retrieves terminal information stored in the storage unit 34, and identifies, from the terminal information, the user ID associated with the above user terminal 12. In other words, the processor identifies the user ID of the user γ having booted the betting app.

Note that, as illustrated in FIG. 13, the terminal information indicates information that associates the terminal ID of the user terminal 12 (terminal identification information) with the name and user ID of the user who is the owner of the user terminal 12.

The processor sets a moving image selection criterion according to the user ID of the user thus identified (S102). In Step S102, the processor sets the moving image selection criterion on per user basis based on information and the like associated with the user ID. Then, based on the criterion thus set, the processor selects a part of the moving images as delivery candidate moving images out of the multiple betting support moving images (S103). In Step S103, the processor selects the delivery candidate moving images on per user basis based on the criterion set on per user basis.

Examples of a method for setting the moving image selection criterion in the second selection processing include the following four methods, for example.

First method: a method for employing, as a criterion, search refinement conditions specified by the user γ

Second method: a method for setting a criterion according to the user's betting history information Third method: a method for setting a criterion according to the user's viewing history information Fourth method: a method for setting a criterion according to another user's viewing history information or betting history information The first method is described. The user whose user ID has been identified in Step S101, that is, the user γ can specify search refinement conditions through the user terminal 12 associated with this user ID. The search refinement conditions indicate matters to be prioritized over others at the time of selecting the delivery candidate moving image, and examples thereof include the performer's enthusiasm degree in each moving image, the number of wins and the like of the performer on the race day, and the number of viewers having made a bandwagon bet while viewing each moving image. The search refinement conditions may further include moving image attributes (categories) or race attributes. Note that, the race attributes correspond to the grade, type, event, race venue, and the like of the race.

In the case of setting the criterion by the first method, in Step S103, the delivery candidate moving images are selected according to the evaluation values having been calculated for the betting support moving images in accordance with the above manner and the search refinement conditions having been specified by the user γ. To put it more concretely, once the user γ operates the user terminal 12 and specifies the search refinement conditions, the processor communicates with the user terminal 12 and receives data indicating the search refinement conditions from the user terminal 12.

The processor calculates, for each of the betting support moving images, the evaluation value based on the analysis result in the first analysis processing, the evaluation value based on the analysis result in the second analysis processing, and the evaluation value based on the analysis result in the third analysis processing, respectively. Then, the processor selects the delivery candidate moving image according to the evaluation value that meets the search refinement conditions out of the evaluation values calculated for each analysis processing. For example, when the user γ specifies the performer's enthusiasm degree in the moving image as the search refinement conditions, in the selection processing, the processor selects the delivery candidate moving image according to the evaluation value based on the analysis result in the first analysis processing (i.e., the enthusiasm degree).

As described above, in the case of setting the criterion by the first method, it is possible to select the delivery candidate moving image while taking into account the search refinement conditions specified by the user γ. Thereby, it is possible to select the delivery candidate moving image while reflecting the user γ's preference or demand.

The second method is described. The processor retrieves, from the storage unit 34, the betting history information out of information on the user γ whose user ID has been identified in Step S101, that is, the user related information. As illustrated in FIG. 4, the betting history information is information associated with the user ID.

The processor identifies a predetermined figure from the betting history information thus retrieved. For example, the predetermined figure is a figure calculated from information associated with the betting ID indicated by the betting history information, more concretely the number of bets or win rate of the user γ. This figure is calculated on per race attribute basis based on information such as the user related information, the betting related information, and the race related information that include the betting ID. In addition, the processor identifies the race attribute the above figure of which meets predetermined conditions, more concretely the race attribute (such as the grade, type, event, and race venue) whose number of bets or win rate of the user γ reaches a threshold. The race attribute thus identified is hereinafter referred to as the "target attribute."

The processor extracts, out of the multiple betting support moving images deliverable at this point, multiple betting support moving images regarding bets on the race that belongs to the target attribute. In addition, the processor executes the first analysis processing to the third analysis processing on the multiple betting support moving images thus extracted according to the procedure described previously, and calculates the evaluation value based on the analysis result in each analysis processing on per moving image basis. Then, according to the evaluation value calculated on per moving image basis, the processor selects the delivery candidate moving image out of the multiple betting support moving images regarding bets on the race that belongs to the target attribute.

As described above, in the case of setting the criterion by the second method, it is possible to select the delivery candidate moving image while taking into account the user γ's betting history. Thereby, it is possible to select the delivery candidate moving image while reflecting the race attribute which the user γ prefers or the race attribute in which the user γ's win rate is high.

Note that, in the case of selecting the delivery candidate moving image on the basis of the evaluation value based on the analysis result of each of the first analysis processing to the third analysis processing, it is also possible to select the delivery candidate moving image while prioritizing the betting support moving images regarding the race that belongs to the target attribute over others. In this case, it is also possible to add, to the delivery candidate moving image, several of the betting support moving images regarding the races that belong to the attributes other than the target attribute.

Other examples are also conceivable as the case of setting the criterion by the second method. For example, the processor may identify, from the betting history information thus retrieved, the number of times the user γ has made a bandwagon bet in the past. The number of times of bandwagon bets in the past indicates the number of times the user γ has made a bet on the same prediction content as the bet made by the performer of the betting support moving image in the past. The number of times of bandwagon bets in the past is added up for each performer of the betting support moving image (specifically the source moving image) based on the user related information and the betting related information that include the betting ID.

Out of the multiple betting support moving images, the processor selects the delivery candidate moving image based on the number of times of bandwagon bets in the past thus identified on per performer basis. For example, the processor selects a predetermined number of performers in the ascending order of the number of times of bandwagon bets in the past, and then selects the betting support moving images of these selected performers as the delivery candidate moving images. According to such a procedure, it is possible to select the delivery candidate moving image in light of the user γ's trend of bandwagon bets in the past (concretely, on which performer the user has made a bandwagon bet many times).

The third method is described. The processor retrieves, from the storage unit 34, the viewing history information out of the user related information on the user γ whose user ID has been identified in Step S101. As illustrated in FIG. 4, the viewing history information is information associated with the user ID.

The processor identifies the number of times the user has viewed the betting support moving image in the past, that is, the number of times viewed in the past from the viewing information thus retrieved. The number of times viewed in the past is added up for each performer of the betting support moving image viewed in the past based on the user related information and the moving image related information that include the betting ID. Then, out of the multiple betting support moving images, the processor selects the delivery candidate moving image based on the number of times viewed in the past thus identified on per performer basis. For example, the processor selects a predetermined number of performers in the ascending order of the number of times viewed in the past, and then selects the betting support moving images of these performers as the delivery candidate moving images. According to such a procedure, it is possible to select the delivery candidate moving image in light of the user γ's trend of viewing moving images (concretely, which performer's moving image the user has viewed many times).

Other examples are also conceivable as the case of setting the criterion by the third method. For example, the processor may add up the number of times viewed in the past on per race attribute basis based on the user related information, the moving image related information, and the race related information that include the betting ID. In this case, the processor identifies the race attribute whose number of times viewed in the past meets predetermined conditions, more concretely the race attribute whose number of times viewed in the past reaches a threshold (hereinafter the second target attribute).

The processor extracts, out of the multiple betting support moving images deliverable at this point, multiple betting support moving images regarding bets on the race that belongs to the second target attribute. In addition, the processor executes the first analysis processing to the third analysis processing on the multiple betting support moving images thus extracted according to the procedure described previously, and calculates the evaluation value based on the analysis result in each analysis processing on per moving image basis.

Then, according to the evaluation value calculated on per moving image basis, the processor selects the delivery candidate moving image out of the multiple betting support moving images regarding bets on the race that belongs to the second target attribute. According to such a procedure, it is possible to select the delivery candidate moving image in light of the user γ's trend of viewing moving images (concretely, which attribute's race the user has viewed many times). Thereby, it is possible to select the delivery candidate moving images while reflecting the race attribute which the user γ prefers.

The fourth method is described. The processor retrieves, from the storage unit 34, friend related information out of the user related information on the user γ whose user ID has been identified in Step S101. The friend related information is information included in the user related information when a friend of the user γ exists (see FIG. 14). The friend indicates a different user who is in the relationship (predetermined relationship) of sharing information on bets with the user γ, for example. Both users may be associated with each other in response to the event where both users acknowledge each other that the user γ and the different user are in the predetermined relationship. The user γ and his/her friend can exchange messages and the like with each other while viewing the same moving image using the function of the betting app. In addition, the user γ and his/her friend may browse each other's betting information. Further, as can be understood from FIG. 14, the friend is associated with the user ID (user identification information) of the user γ.

The processor retrieves the viewing history information out of the user related information of the user γ's friend, and selects, from the multiple betting support moving images, the delivery candidate moving image based on the criterion set according to the viewing history information thus retrieved. Concretely, for example, the processor identifies the betting support moving image that the friend is viewing, and selects, as the delivery candidate moving image, the same moving image as this betting support moving image or other betting support moving images regarding the race whose outcome is predicted in this betting support moving image.

Alternatively, if the friend views the betting support moving image of a certain performer frequently (concretely a predetermined number of times or more in a predetermined period), the processor may identify this performer (hereinafter the target performer), and selects, as the delivery candidate moving image, the moving image of the target performer out of the betting support moving images currently available.

As described above, in the case of setting the criterion by the fourth method, it is possible to select the delivery candidate moving image while taking into account the situation where the user γ's friend views the moving image of.

Meanwhile, in the fourth method, the processor may retrieve the betting history information out of the user related information of the user γ's friend, and select, from the multiple betting support moving images, the delivery candidate moving image based on the criterion set according to the betting history information thus retrieved. Concretely, for example, the processor identifies, out of the friend's betting history information, the target race (corresponding to the target competition) which is the race on which the friend has made a bet in the predetermined period. Then, the processor selects, out of the multiple betting support moving images, the betting support moving image associated with the target race as the delivery candidate moving image. The betting support moving image associated with the target race indicates the moving image on bets made by predicting the outcome of the target race, that is, the betting support moving image on the target race.

According to the above procedure, it is possible to select the delivery candidate moving image while taking into account the friend's betting situation. Thereby, it is possible to notify the user γ of the betting support moving image regarding the race on which the friend has made a bet.

Note that, in the fourth method, without being limited to the case where the user γ's friend is identified as the different user associated with the user ID of the user γ, a user belonging to the same group as the user γ may be identified as the different user, for example. Alternatively, a target user specified by the user γ (for example, the user γ's favorite user or a user followed by the user γ) may be identified as the different user.

Regarding Third Embodiment

Figure 15:
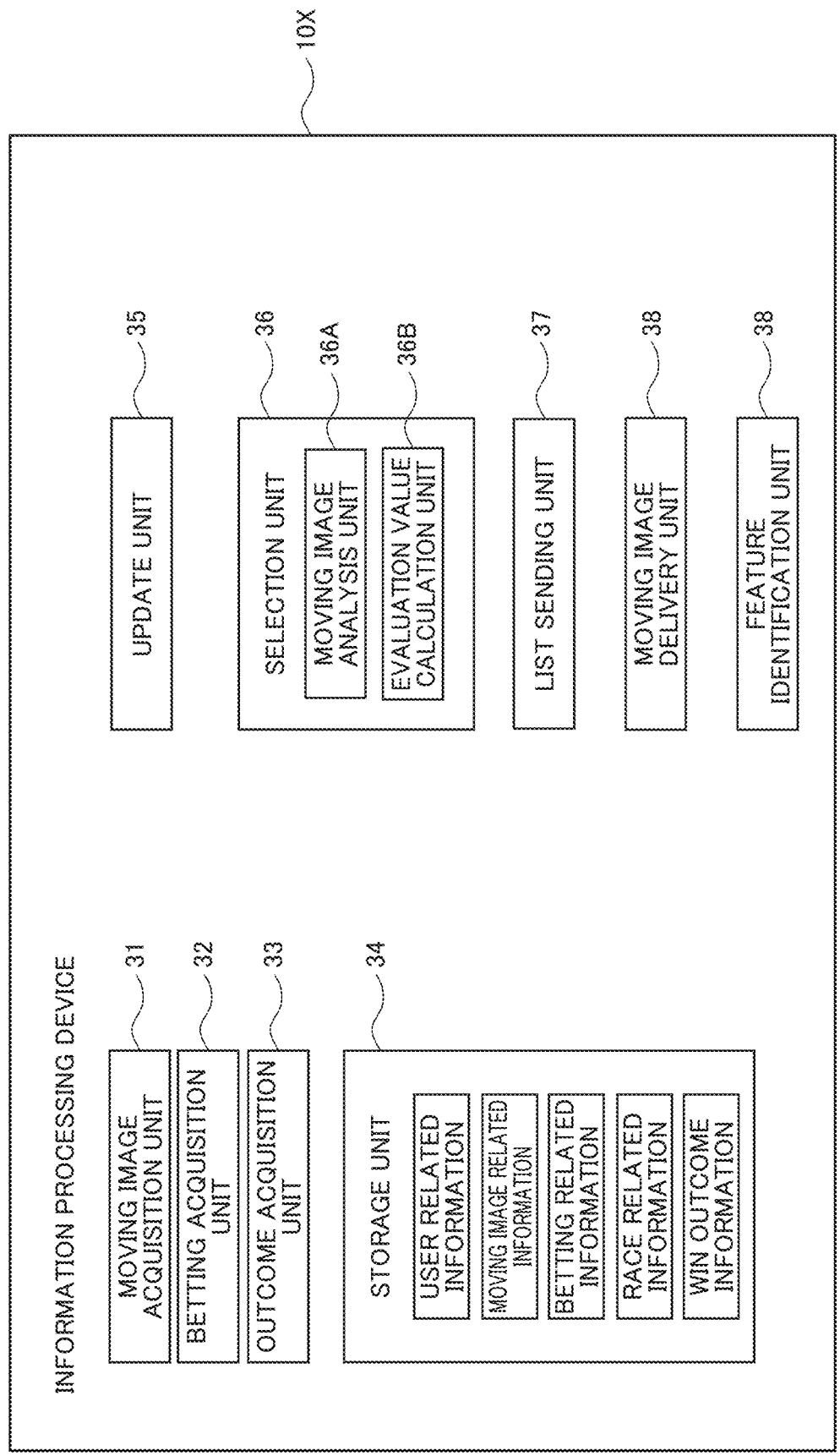
FIG. 15 is a diagram illustrating functions of an information processing device in a different embodiment of the present invention.

In the second embodiment, the processor selects the delivery candidate moving image while reflecting the user γ's preference or demand by taking into account the search refinement conditions specified by the user γ. However, by learning, via machine learning, the features of the betting support moving images that the user γ has viewed in the past and selecting the delivery candidate moving image using this learned result, it is possible to determine the delivery candidate moving image while reflecting the user γ's preference more precisely. Such an embodiment (hereinafter the third embodiment) is described with reference to FIGS. 15 and 16. Note that, in the following description, the third embodiment is described mainly in terms of points different from the first embodiment. In addition, in FIG. 15, functional units which are the same as the functional units of the first embodiment are given the same reference signs as the reference signs illustrated in FIG. 3.

An information processing device 10X according to the third embodiment further has a feature identification unit 39 in addition to the functional units included in the information processing device 10 according to the first embodiment. The feature identification unit 39 is configured to identify, via learning, the features of bet moving images in which the user γ has made a bet during viewing out of the betting support moving images that the user γ has viewed in the past.

To put it more specifically, the feature identification unit 39 identifies, via machine learning, the feature of a predetermined moving image out of the bet moving images. The predetermined moving image indicates a moving image such that the user γ has made a bandwagon bet, that is, a bet on the same prediction content as the bet made by the performer of this predetermined moving image while viewing this moving image. The predetermined moving image is identified based on the information associated with the user ID of the user γ (concretely the viewing history information and the betting history information in the user related information) and the moving image related information. In other words, the processor constituting the feature identification unit 39 identifies the feature of the predetermined moving image through learning based on the information associated with the user ID of the user γ.

The feature of the moving image indicates the content that features this moving image, and concretely corresponds to information such as: the attributes (categories) of the performer of the moving image; the number of performers; things that the members of the performer group have in common; the behavior (the enthusiasm degree) of the performer in the moving image; the attributes of the race on which the performer makes a bet; and the trend (the number of bets and the magnitude of the betting amount) of bets made by the performer. A publicly-known annotation tool can be employed at the time of extracting the feature of the moving image. The annotation tool is a tool for annotating the target moving image with tag information (metadata) associated with this moving image.

The feature identification unit 39 executes machine learning using teacher data which is a set of the feature (concretely metadata) of each of the betting support moving images that the user γ has viewed in the past and whether or not the user γ has made a bandwagon bet while viewing this moving image. The algorithm of machine learning is not particularly limited, and algorithms such as genetic programming, inductive programming, support-vector machines, clustering, a Bayesian network, extreme learning machines (ELMs), and decision tree learning may be used, for example. In addition, as a method for minimizing an objective function (loss function) in neural network machine learning, a gradient decent method may be used, or alternatively backpropagation may be used.

Figure 16:
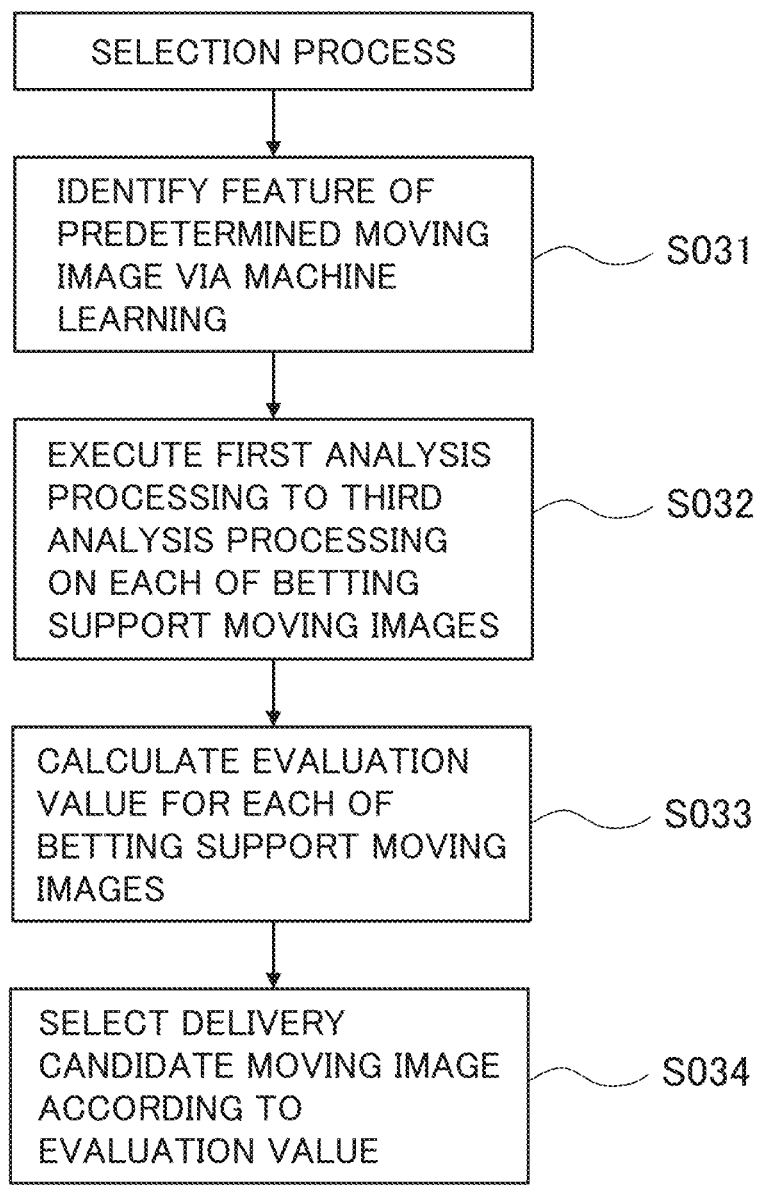
FIG. 16 is a diagram illustrating a flow of selection processing in the different embodiment of the present invention.

In the selection processing in the moving image delivery flow according to the third embodiment, as illustrated in FIG. 16, the processor of the computer constituting the information processing device 10X executes feature identification processing. In the feature identification processing, the processor identifies, via machine learning, the feature of the predetermined moving image (that is, the moving image that the user γ has made a bandwagon bet during viewing of this moving image out of the betting support moving images that the user γ has viewed in the past) (S031). The feature identification processing does not necessarily have to be executed during the moving image delivery flow, but instead may be executed prior to the moving image delivery flow.

The flow of the selection processing after Step S031 is the same as that of the first embodiment, and the processor executes the first analysis processing to the third analysis processing on each of the multiple betting support moving images posted on the race day (S032). Then, the processor calculates the evaluation value based on the analysis result of each analysis processing (S033), and selects the delivery candidate moving image according to the evaluation value (S034).

Thereafter, the processor (specifically the list sending unit 37) sends the user γ the delivery candidate list indicating the delivery candidate moving image(s) thus selected. In this event, the processor determines the delivery candidate list according to the feature of the moving image identified in Step S031. To put it more concretely, after selecting a predetermined number of the betting support moving images as the delivery candidate moving images in the ascending order of the evaluation value, the processor determines whether or not each of the moving images thus selected has the feature identified in Step S031, and adds the moving image having this feature to the delivery candidate list.

In other words, in the third embodiment, the processor sends the user γ the delivery candidate list indicating the delivery candidate moving image(s) being selected according to the evaluation value and having the feature of the predetermined moving image identified via machine learning. As described above, in the third embodiment, it is possible to determine the delivery candidate moving image according to the user γ's preference. Specifically, it is possible to add the moving image, having the same feature as the moving image that the user γ has made a bandwagon bet in the past, to the delivery candidate list and recommend this list to the user γ.

Note that, in the above case, the feature of the bet moving image in which the user γ has made a bet during viewing of this moving image is identified out of the betting support moving images that the user γ has viewed in the past. However, without being limited thereto, it is also possible to identify the feature of the moving image whose viewing time is long (concretely the moving image whose viewing time exceeds a predetermined time) out of the betting support moving images that the user γ has viewed in the past, and then select the delivery candidate moving image based on this identification result, for example.

In addition, machine learning is not limited to one executed for the purpose of identifying the feature of the moving image that the user γ has viewed, and machine learning may be executed for the purpose of identifying the trend of bets that the user γ has made in the past irrespective of whether or not the user has viewed the moving image. For example, the processor may execute machine learning based on information associated with the user ID of the user γ, more concretely information such as the betting history information, and set the criterion according to the result of this machine learning on per user basis. According to machine learning of this case, a candidate selection model is constructed as the criterion for selecting the delivery candidate moving image.

The candidate selection model is a mathematical model designed to output, for each of the multiple betting support moving images, its fitness for use as the delivery candidate moving image by receiving input of the user γ's betting history information.

The betting history information being information to be input to the model includes information on: the attributes of races that the user has made a bet in the past; the number of bets on the race belonging to each attribute; and the user's preference on the betting content, for example. Examples of the information on the race attributes include the event and grade of the race, the number of competitors joining the race, and the race venue. Examples of the information on the user's preference on the betting content include information such as whether or not the user frequently makes bets on the betting content whose odds are high (or low).

The fitness output from the model is an index value indicating whether or not the betting support moving image is suitable for the delivery candidate moving image, and more concretely is a weight value which is determined according to the race attributes associated with each betting support moving image. Note that, the more the race is one belonging to the attribute on which the user makes bets frequently, the higher the fitness (weight) of the betting support moving image associated with this race becomes.

The candidate selection model is constructed on per user basis. Then, by using the candidate selection model constructed on per user basis, the processor selects the delivery candidate moving image on per user basis out of the multiple betting support moving images. Concretely, the processor selects a predetermined number of the betting support moving images as the delivery candidate moving images in the ascending order of the fitness output from the model.

According to the above procedure, it is possible to select the delivery candidate moving image while taking into account the user's betting history, in particular the attributes of the race on which the user has made bets frequently.

Regarding Fourth Embodiment

Figure 17:
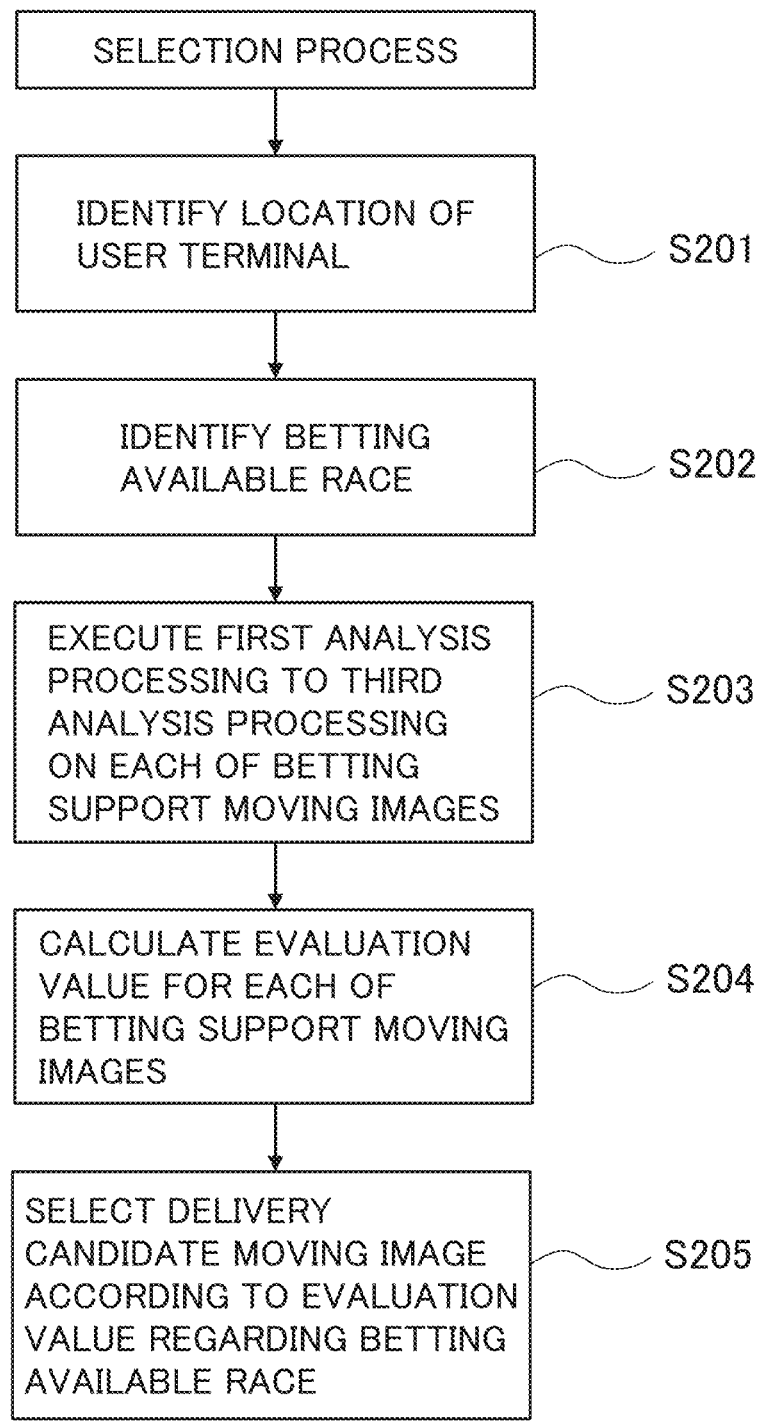
FIG. 17 is a diagram illustrating a flow of selection processing in a still different embodiment of the present invention.

In the selection processing, it is also possible to further take into account the user γ's current location, more strictly the location of the user terminal 12 that the user γ is using. In other words, it is also possible to set the criterion according to the location of the user terminal 12 associated with the user identification information, and select the delivery candidate moving image based on this criterion. Such an embodiment (hereinafter the fourth embodiment) is described with reference to FIG. 17. Note that, in the following description, the fourth embodiment is described mainly in terms of points different from the above embodiments.

In the selection processing according to the fourth embodiment, first, the processor of the computer constituting the information processing device communicates with the user terminal 12 of the user γ, and identifies the location of the user terminal 12 based on information received from the user terminal (S201). A method for identifying the location of the user terminal 12 is not particularly limited. For example, when the user terminal 12 is equipped with a location detection function by Global Positioning System (GPS), the location of the user terminal 12 may be identified by receiving, from the user terminal 12, data indicating the location (latitude, longitude, and altitude) detected using this function.

Then, based on the location of the user terminal 12 thus identified, the processor identifies the race on which betting is available at this location (S202). The race on which betting is available at a certain location indicates a race on which betting is permitted (legalized) at a spot or area corresponding to this location. Hereinbelow, the race on which betting is available at a certain location is referred to as a betting available race. A method for identifying the betting available race is not particularly limited. For example, the betting available race at the location of the user terminal 12 may be identified by referring to map data indicating the correspondence between each location on the map and the betting available race at this location.

After identifying the betting available race, the processor extracts, out of the multiple betting support moving images currently available, the multiple betting support moving images regarding bets on the betting available race. Then, the processor executes the first analysis processing to the third analysis processing on each of the multiple betting support moving images thus extracted according to the procedure described previously, and calculates the evaluation value based on the analysis result in each analysis processing on per moving image basis (S203, S204). Thereafter, according to the evaluation value thus calculated on per moving image basis, the processor selects the delivery candidate moving image out of the multiple betting support moving images regarding bets on the betting available race (S205).

As has been described above, in the fourth embodiment, it is possible to select the delivery candidate moving image while further taking into account the location of the user terminal 12 that the user γ is using. Thereby, it is possible to select the delivery candidate moving image appropriately while reflecting the current location of the user γ.

Other Embodiments

Concrete examples of the information processing device, the information processing method, and the program according to the present invention have been described above. However, the above embodiments are merely an example, and other embodiments are also conceivable.

In the above embodiments, the processor of the server computer serves as the information processing device of the present invention. Instead, a part of the functions of the server computer described above, for example the selection unit 36 may be implemented by the user terminal 12. In other words, the processor included in the information processing device of the present invention may be included in each of the server computer and the user terminal 12. In this case, the processor of the user terminal 12 may evaluate each of the multiple betting support moving images based on the enthusiasm degree and the number of wins of the performer and the like, and select the delivery candidate moving image according to these evaluation results.

In addition, in the above embodiments, for evaluating each of the multiple betting support moving images, each of the moving images is analyzed, more concretely the performer's speech content, facial expression, or the like, the betting amount, the number of wins, and the like of bets made by the performer in this moving image, and the number of viewers having made a bandwagon bet during viewing of this moving image are identified. Then, each of the betting support moving images is evaluated according to the analysis results thus identified (i.e., the results of the analysis performed from the three perspectives), more specifically the evaluation value is calculated based on each of the results of the analysis performed from the three perspectives. However, without being limited thereto, each of the betting support moving images may be evaluated based on any of the results of the analysis performed from the three perspectives described above.

Further, in the above embodiments, for evaluating each of the betting support moving images available in the predetermined period, the information that can be acquired within this delivery period is used, for example the number of wins of the performer in the delivery period, the number of viewers having made a bandwagon bet in the delivery period, and the like are used. In other words, in the above embodiments, even in the case of the betting support moving images in which the same performer appears, if their delivery periods (delivery dates) are different from each other, information used for evaluation is changed and thus evaluation (evaluation value) is also changed. However, without being limited thereto, the betting support moving image may be evaluated using fixed information not affected by its delivery period (e.g., information such as the performer's personal information).

Furthermore, in the above embodiments, the selection unit 36 selects the moving image according to the evaluation result of each moving image, more specifically the magnitude of the evaluation value for each moving image as the criterion (predetermined criterion) for selecting the delivery candidate moving image out of the multiple betting support moving images. However, the selection method is not limited to this. For example, instead of evaluating each moving image, it is also possible to select the delivery candidate moving image through search refinement by the user as in the second embodiment described previously, or alternatively select the delivery candidate moving image by identifying the feature of the predetermined moving image using machine learning as in the third embodiment described previously and selecting the betting support moving image having this feature as the delivery candidate moving image.

Summary

An information processing device of the present invention is an information processing device that is configured to deliver, to a user, a moving image on a bet made by predicting an outcome of a predetermined competition, the information processing device including: a selection unit that is configured to select, out of multiple moving images, a part of moving images as a delivery candidate moving image based on a predetermined criterion; and a list sending unit that is configured to send the user a list indicating the delivery candidate moving image thus selected.

According to the above configuration, by selecting, out of the multiple betting related moving images, the moving image which can be recommended to the user based on the predetermined criterion and presenting the user with the selected moving image as the delivery candidate moving image, it is possible to deliver the moving image to the user effectively. As a result, the user can view the moving image which is beneficial in betting.

Meanwhile, in the information processing device of the present invention, the selection unit may select the delivery candidate moving image out of the multiple moving images according to an evaluation result on at least one of a voice and an image of a performer in each of the moving images.

According to the above configuration, since the delivery candidate moving image is selected out of the multiple moving images according to the evaluation result on the voice or video of the performer of each of the moving images, it is possible to present the user with more appropriate moving image, for example a moving image in which the performer's enthusiasm degree is high as the delivery candidate moving image.

Meanwhile, in the above configuration, the selection unit may calculate an evaluation value for each of the multiple moving images based on the number of performers speaking in the moving image, and select the delivery candidate moving image according to the evaluation value for each of the moving images. In this case, the selection unit preferably sets, at a higher value, the evaluation value for the moving image in which multiple performers speak.

According to the above configuration, by calculating the evaluation value for each of the moving images based on the number of performers speaking in this moving image, it is possible to evaluate the enthusiasm degree of the moving image appropriately. Then, by selecting the delivery candidate moving image according to the evaluation value, it is possible to present the user with more appropriate moving image (i.e., the moving image whose enthusiasm degree is high).

Meanwhile, in the above configuration, the selection unit may identify, for each of the multiple moving images, a facial expression of a performer in the moving image from an image of the performer, calculate an evaluation value based on the facial expression of the performer thus identified, and select the delivery candidate moving image according to the evaluation value for each of the moving images. In this case, the selection unit preferably sets, at a higher value, the evaluation value for the moving image in which the performer with a predetermined facial expression is shown.

According to the above configuration, by calculating the evaluation value based on the facial expression of the performer in each of the moving images, it is possible to evaluate the enthusiasm degree of the moving image more appropriately. In addition, by selecting the delivery candidate moving image according to the evaluation value, it is possible to present the user with more appropriate moving image (i.e., the moving image whose enthusiasm degree is high).

Meanwhile, in the information processing device of the present invention, the selection unit may select the delivery candidate moving image out of the multiple moving images according to an evaluation result obtained based on information on a bet made by the performer in each of the moving images.

According to the above configuration, since the delivery candidate moving image is selected out of the multiple moving images according to the evaluation result on information such as the betting content or win outcome of the performer of each of the moving images, it is possible to present the user with more appropriate moving image, for example the moving image which is beneficial for the user in betting as the delivery candidate moving image.

Meanwhile, in the case where the predetermined competition is held multiple times in a predetermined period and a bet is made each time the predetermined competition is held, the selection unit may calculate, for each of the multiple moving images, an evaluation value based on a figure on a bet of the performer of the moving image won in the immediately preceding predetermined competition in the predetermined period, and select the delivery candidate moving image according to the evaluation value for each of the moving images. In this case, the selection unit preferably sets the evaluation value at a higher value as the above figure is larger.

According to the above configuration, by calculating the evaluation value for each of the moving images based on the figure (such as the betting amount or dividends) on the bet won in the immediately preceding predetermined competition and selecting the delivery candidate moving image according to the evaluation value, it is possible to present the user with more appropriate moving image (i.e., the moving image which is beneficial for the user in betting).

Meanwhile, the selection unit may calculate, for each of the multiple moving images, an evaluation value based on the number of consecutive times of bets won among multiple bets that the performer of the moving image has made in the predetermined period, and select the delivery candidate moving image according to the evaluation value for each of the moving images. In this case, the selection unit preferably sets the evaluation value at a higher value as the number of consecutive times is larger.

According to the above configuration, by calculating the evaluation value for each of the moving images based on the number of consecutive times of bets won and selecting the delivery candidate moving image according to the evaluation value, it is possible to present the user with more appropriate moving image (i.e., the moving image which is beneficial for the user in betting).

Meanwhile, in the case where the predetermined competition is held multiple times in the predetermined period and a bet is made each time the predetermined competition is held, the selection unit may calculate, for each of the multiple moving images, an evaluation value based on variation (the amount of increase/decrease) in the betting amount among bets made by the performer of the moving image in the predetermined period, and select the delivery candidate moving image according to the evaluation value for each of the moving images.

According to the above configuration, by calculating the evaluation value for each of the moving images based on the variation (increase/decrease) in the betting amount among the bets made by the performer of each of the moving images and selecting the delivery candidate moving image according to the evaluation value, it is possible to present the user with more appropriate moving image (i.e., the moving image which is beneficial for the user in betting).

Meanwhile, in the information processing device of the present invention, the selection unit may select the delivery candidate moving image out of the multiple moving images according to an evaluation result obtained based on information on a viewer of each of the moving images having made a bet during viewing of the moving image.

According to the above configuration, since the delivery candidate moving image is selected out of the multiple moving images according to the evaluation result regarding information such as the number of viewers having made a bet during viewing of each of the moving images, it is possible to present the user with more appropriate moving image, for example the moving image which is beneficial for the user in betting as the delivery candidate moving image.

Meanwhile, in the above configuration, the selection unit may calculate, for each of the multiple moving images, an evaluation value based on the number of viewers having made a bet on the same prediction content as a bet made by the performer of the moving image during viewing of the moving image, and select the delivery candidate moving image according to the evaluation value for each of the moving images.

According to the above configuration, by calculating the evaluation value for each of the moving images based on the number of viewers having made a bet on the same prediction content as the bet made by the performer of the moving image (that is, a bandwagon bet) and selecting the delivery candidate moving image according to the evaluation value, it is possible to present the user with more appropriate moving image (i.e., the moving image which is beneficial for the user in betting).

Meanwhile, in the case where a time slot for holding the predetermined competition and a time slot for accepting a bet iterate, the selection unit may calculate, for each of the multiple moving images, an evaluation value for the moving image during the bet accepting time slot, and select the delivery candidate moving image according to the evaluation value for each of the moving images.

According to the above configuration, the evaluation value for the moving image during the bet accepting time slot is calculated for each of the moving images. Here, during the bet accepting time slot, the performer of the moving image makes a bet or gets excited. Accordingly, by selecting the delivery candidate moving image according to the evaluation value for the moving image during the bet accepting time slot, it is possible to present the user with more appropriate moving image, that is, the moving image whose enthusiasm degree is high, and the moving image which is beneficial for the user in betting.

Meanwhile, in the case where the predetermined competition is held multiple times in the predetermined period and a bet is made each time the predetermined competition is held, the selection unit may calculate, for each of the multiple moving images delivered in real time in the predetermined period, an evaluation value for the moving image every time the predetermined competition is held in the predetermined period, and select the delivery candidate moving image according to the evaluation value for each of the moving images.

When the predetermined competition is held multiple times in the predetermined period, the evaluation result of the moving image sometimes varies between them. In light of this, in the above configuration, the selection unit calculates the evaluation value for each of the moving images every time the predetermined competition is held, and selects the delivery candidate moving image according to the evaluation value. Thereby, it is possible to select the delivery candidate moving image based on the evaluation value obtained at this point, and thus possible to deliver the moving image which can be recommended at this point to the user effectively.

Meanwhile, the information processing device of the present invention includes a feature identification unit that is configured to identify, through learning, a feature of a bet moving image in which the user has made a bet during viewing out of the moving images that the user has viewed in the past. The list sending unit may send the user a list indicating the delivery candidate moving image being selected by the selection unit and having the feature identified by the feature identification unit.

According to the above configuration, the feature of the moving image that the user has viewed in the past and has made a bet during viewing (the bet moving image) is identified, and the feature of the bet moving image is reflected at the time of presenting the user with the delivery candidate moving image. Thereby, it is possible to present the user with the delivery candidate moving image in light of the user's preference and intention.

Meanwhile, in the above configuration, the feature identification unit may identify the feature of a predetermined moving image out of the bet moving image. In this case, the predetermined moving image may be a moving image such that the user has made a bet on the same prediction content as a bet made by the performer of the predetermined moving image while viewing the predetermined moving image.

According to the above configuration, the feature of the bet moving image such that the user has made a bet on the same prediction content as the bet made by the performer (i.e., a bandwagon bet) is identified, and the feature of this moving image is reflected at the time of presenting the user with the delivery candidate moving image. Thereby, it is possible to present the user with the delivery candidate moving image in light of the user's intention (idea on betting).

Meanwhile, an information processing method of the present invention is an information processing method for delivering, to a user, a moving image on a bet made by predicting an outcome of a predetermined competition, the information processing method including: causing a computer to select, out of multiple moving images, a part of moving images as a delivery candidate moving image based on a predetermined criterion; and causing the computer to send the user a list indicating the delivery candidate moving image thus selected.

By using the information processing method described above, it is possible to deliver the betting related moving image to the user effectively, and thus the user can view the moving image which is beneficial in betting.

Meanwhile, a program of the present invention is a program for delivering, to a user, a moving image on a bet made by predicting an outcome of a predetermined competition, the program causing a computer to: select, out of multiple moving images, a part of moving images as a delivery candidate moving image; and send the user a list indicating the delivery candidate moving image thus selected.

By causing the computer to execute the above program, it is possible to deliver the betting related moving image to the user effectively, and thus the user can view the moving image which is beneficial in betting.

Meanwhile, an information processing device according to one embodiment of the present invention is an information processing device that is configured to deliver, to a user terminal, a moving image on a bet made by predicting an outcome of a predetermined competition, the information processing device including a processor, in which the processor identifies user identification information associated with the user terminal, the processor selects, out of multiple moving images, a part of moving images as a delivery candidate moving image based on a criterion set according to the user identification information, the processor displays, on a display unit of the user terminal, a list indicating the delivery candidate moving image thus selected, and the processor displays, on the display unit of the user terminal, one of the moving images selected out of the delivery candidate moving image included in the list.

According to the above configuration, it is possible to select, out of the multiple betting related moving images, the moving image which can be recommended to the user based on the criterion set according to the user identification information. In other words, it is possible to select, for each user, the delivery candidate moving image suitable for the user. Thereby, it is possible to select the delivery candidate moving image while taking into account the user's taste, situation where the moving image is viewed, and the like, and present the user with the delivery candidate moving image thus selected. As a result, it is possible to deliver the betting related moving image to the user effectively, and the user can view the moving image which is beneficial in betting.

Meanwhile, the processor may display the moving image in a first display area in the display unit, and display betting information, associated with the moving image displayed in the first display area, in a second display area in the display unit. In this case, the processor may be capable of accepting, through the user terminal, a bet based on the betting information displayed in the second display area.

According to the above configuration, it is possible to display the moving image in the first display area in the display unit and, at the same time, display the betting information, used when the user makes a bet, in the second display area in the display unit. Thereby, it is possible to make a bet based on the betting information efficiently while referring to the information acquired from the moving image.

Meanwhile, the processor may select the delivery candidate moving image out of the multiple moving images based on a search refinement condition specified through the user terminal associated with the user identification information.

According to the above configuration, the processor selects the delivery candidate moving image while taking into account the search refinement condition specified by the user. Thereby, it is possible to present the user with the delivery candidate moving image while reflecting the user's preference, demand, or the like.

Meanwhile, the processor may select the delivery candidate moving image out of the multiple moving images based on a criterion set according to user's betting history information associated with the user identification information.

According to the above configuration, the processor selects the delivery candidate moving image while taking into account the user's betting history. Thereby, it is possible to present the user with the delivery candidate moving image that is selected while the attribute of a competition that the user prefers or the attribute of a competition in which the user's win rate is high is reflected.

Meanwhile, in the above configuration, the processor may identify an attribute of a predetermined competition whose figure, identified from the betting history information, meets a predetermined condition. In this case, the processor may select, out of the multiple moving images, the moving image regarding a bet on the predetermined competition that belongs to the identified attribute as the delivery candidate moving image.

According to the above configuration, it is possible to identify the attribute of the competition that the user prefers or the attribute of the competition in which the user's win rate is high based on the figure identified from the betting history information. Then, by selecting the moving image associated with the competition belonging to the identified attribute as the delivery candidate moving image, it is possible to present the user with the moving image which is beneficial for the user more appropriately.

Meanwhile, the processor may identify, on per performer basis, the number of times a bet on the same prediction content as the bet made by the performer of the moving image has been made in the past during viewing of the moving image based on the betting history information. In this case, the processor may select, out of the multiple moving images, the delivery candidate moving image based on the number of times thus identified on per performer basis.

According to the above configuration, the processor identifies, on per performer of the moving image basis, the number of times a bet on the same prediction content as the bet made by the performer of the moving image (i.e., a bandwagon bet) has been made, and selects the delivery candidate moving image based on the number of times thus identified on per performer basis. Thereby, it is possible to select, as the delivery candidate moving image, the moving image of the performer for which the number of times of bandwagon bets is larger, for example. As a result, it is possible to present the user with the moving image which is beneficial for the user in betting.

Meanwhile, the processor may identify a different user who is in a predetermined relationship with the user and associated with the user identification information. In this case, the processor may select the delivery candidate moving image out of the multiple moving images based on a criterion set according to information on the different user.

According to the above configuration, it is possible to select the delivery candidate moving image in consideration of the information on the different user who is in the predetermined relationship with the user. Thereby, it is possible to present the user with a moving image and the like regarding a competition that the different user prefers, and provide the user with a chance to interact with the different user, for example.

Meanwhile, in the above configuration, the processor may select the delivery candidate moving image out of the multiple moving images based on information on a situation where the different user views the moving image.

According to the above configuration, it is possible to select the delivery candidate moving image while taking into account the different user's moving image viewing situation. Thereby, for example, when the different user frequently views the moving image of a certain performer, it is possible to present the user with the moving image of this performer as the delivery candidate moving image.

Meanwhile, in the above configuration, the processor may select the delivery candidate moving image out of the multiple moving images based on the moving image associated with a target competition which is the predetermined competition on which the different user has made a bet.

According to the above configuration, it is possible to select the delivery candidate moving image while taking into account the different user's betting situation, more specifically the attribute of the target competition on which the different user has made a bet. Thereby, it is possible to present the user with the moving image associated with the target competition on which the different user has made a bet and the moving image associated with a competition belonging to the same attribute as the target competition, for example.

Meanwhile, the processor may select, out of the multiple moving images, a part of the moving images as the delivery candidate moving image based on a criterion set according to a result of machine learning using information associated with the user identification information.

According to the above configuration, the processor learns the user's trend such as his/her taste and moving image viewing situation, and selects the delivery candidate moving image using this learned result. Thereby, it is possible to select a proper moving image as the delivery candidate moving image, and thus present the user with the moving image which is beneficial in betting appropriately.

Meanwhile, the processor may select the delivery candidate moving image out of the multiple moving images based on a criterion set according to a location of the user terminal associated with the user identification information.

According to the above configuration, it is possible to select the delivery candidate moving image while taking into account the location of the user terminal that the user is using. Thereby, it is possible to select an appropriate moving image as the delivery candidate moving image in consideration of the current location of the user.

Meanwhile, in the above configuration, the processor may select, out of the multiple moving images, the moving image regarding a bet on a predetermined competition on which betting is available at the location as the delivery candidate moving image.

According to the above configuration, at the time of selecting the delivery candidate moving image in consideration of the current location of the user, it is possible to select the moving image regarding a bet on a competition on which betting is available at the current location of the user, for example. Thereby, it is possible to present the user with a moving image which is beneficial in terms of betting which is available at the current location of the user.

Meanwhile, when selecting the multiple delivery candidate moving images, the processor may set priority for each of the delivery candidate moving images, and display, on the display unit, the list indicating the multiple delivery candidate moving images arranged in the order of priority.

According to the above configuration, the user can check the delivery candidate moving images in the ascending order of priority, for example. Thereby, when the multiple delivery candidate moving images are included in the list, the user can check these moving images efficiently.

Meanwhile, an information processing method of the present invention is an information processing method for delivering, to a user terminal, a moving image on a bet made by predicting an outcome of a predetermined competition, the information processing method including: causing a computer to identify user identification information associated with the user terminal; causing the computer to select, out of multiple moving images, a part of moving images as a delivery candidate moving image based on a criterion set according to the user identification information; causing the computer to display, on a display unit of the user terminal, a list indicating the delivery candidate moving image thus selected; and causing the computer to display, on the display unit of the user terminal, one moving image selected out of the delivery candidate moving image included in the list.

According to the above method, it is possible to select, on per user basis, the delivery candidate moving image according to the user. Thereby, it is possible to present the user with the delivery candidate moving image selected with the user's taste, situation where the moving image is viewed, and the like taken into account.

Meanwhile, a program of the present invention is a program for delivering, to a user terminal, a moving image on a bet made by predicting an outcome of a predetermined competition, the program causing a computer to execute: a process of identifying user identification information associated with the user terminal; a process of selecting, out of multiple moving images, a part of moving images as a delivery candidate moving image based on a criterion set according to the user identification information; a process of displaying, on a display unit of the user terminal, a list indicating the delivery candidate moving image thus selected; and a process of displaying, on the display unit of the user terminal, one moving image selected out of the delivery candidate moving image included in the list.

By causing the computer to execute the above program, it is possible to select, on per user basis, the delivery candidate moving image according to the user. Thereby, it is possible to present the user with the delivery candidate moving image selected with the user's taste, a situation where the moving image is viewed, and the like taken into account.

REFERENCE SIGNS LIST 10, 10X: Information processing device
12: User terminal
14: Communication line network
21: Processor
22: Memory
23: Communication interface
24: Storage
25: Bus
31: Moving image acquisition unit
32: Betting acquisition unit
33: Outcome acquisition unit
34: Storage unit
35: Update unit
36: Selection unit
36A: Moving image analysis unit
36B: Evaluation value calculation unit
37: List sending unit
38: Moving image delivery unit
39: Feature identification unit
S: Information processing system
T1: Upper area (first display area)
T2: Central area (second display area)
T3: Lower area (second display area)

The invention claimed is:

1. An information processing device configured to deliver, to a user terminal, a moving image on a bet made by predicting an outcome of a predetermined competition, the information processing device comprising a processor, wherein
the processor is configured to communicate with a storage device that stores a plurality of moving images;
the processor calculates an evaluation value of each of the plurality of moving images;
the processor selects at least one of the plurality of moving images as a delivery candidate moving image based on the calculated evaluation value filtered using a predetermined criterion;
the processor generates a list of the delivery candidate moving image, and
the processor sends the user terminal the list of the delivery candidate moving image.

2. The information processing device according to claim 1, wherein
the evaluation value is calculated based on information on a bet made by a performer in each of the moving images.

3. The information processing device according to claim 2, wherein, in the case where the predetermined competition is held a plurality of times in a predetermined period and a bet is made each time the predetermined competition is held,
the processor calculates, for each of the plurality of moving images, the evaluation value based on a figure on a bet of the performer of the moving image won in the immediately preceding predetermined competition in the predetermined period and selects the delivery candidate moving image according to the evaluation value for each of the moving images, and
the processor sets the evaluation value at a higher value as the above figure is larger.

4. The information processing device according to claim 2, wherein
the processor calculates, for each of the plurality of moving images, the evaluation value based on the number of consecutive times of bets won among a plurality of bets that the performer of the moving image has made in the predetermined period and selects the delivery candidate moving image according to the evaluation value for each of the moving images, and
the processor sets the evaluation value at a higher value as the number of consecutive times is larger.

5. The information processing device according to claim 2, wherein, in the case where the predetermined competition is held multiple times in the predetermined period and a bet is made each time the predetermined competition is held,
the processor calculates, for each of the plurality of moving images, the evaluation value based on variation in a betting amount among bets made by the performer of the moving image in the predetermined period and selects the delivery candidate moving image according to the evaluation value for each of the moving images.

6. The information processing device according to claim 1, wherein
the evaluation value is calculated based on information on a viewer of each of the moving images having made a bet during viewing of the moving image.

7. The information processing device according to claim 6, wherein
the processor calculates, for each of the plurality of moving images, the evaluation value based on the number of viewers having made a bet on the same prediction content as a bet made by the performer of the moving image during viewing of the moving image.

8. The information processing device according to claim 1, wherein, in the case where a time slot for holding the predetermined competition and a time slot for accepting a bet iterate,
the processor calculates, for each of the plurality of moving images, the evaluation value for the moving image during the bet accepting time slot and selects the delivery candidate moving image according to the evaluation value for each of the moving images.

9. The information processing device according to claim 1, wherein
the processor identifies, through learning, a feature of a bet moving image in which a user has made a bet during viewing out of the moving images that the user has viewed in the past, and
the processor sends the user terminal the list of the delivery candidate moving image being selected by the processor and having the feature identified by the processor.

10. The information processing device according to claim 9, wherein
the processor identifies the feature of a predetermined moving image out of the bet moving image, and the predetermined moving image is a moving image such that the user has made a bet on the same prediction content as a bet made by the performer of the predetermined moving image while viewing the predetermined moving image.

11. The information processing device according to claim 1, wherein
the processor identifies user identification information associated with the user terminal,
the predetermined criterion is based on a criterion set according to the user identification information,
the processor displays, on a display unit of the user terminal, the list of the delivery candidate moving image, and
the processor displays, on the display unit of the user terminal, a content of one of the delivery candidate moving image selected on the display unit by a user.

12. The information processing device according to claim 11, wherein
the processor selects the delivery candidate moving image out of the plurality of moving images based on the criterion set according to the user's betting history information associated with the user identification information.

13. The information processing device according to claim 12, wherein
the processor identifies an attribute of the predetermined competition whose figure, identified from the user's betting history information, meets the predetermined condition, and
the processor selects the at least one the plurality of moving images regarding a bet on the predetermined competition that belongs to the identified attribute as the delivery candidate moving image.

14. The information processing device according to claim 12, wherein
the processor identifies, on per performer basis, the number of times a bet on the same prediction content as a bet made by the performer of the moving image has been made in the past based on the betting history information, and
the processor selects the at least one of the plurality of moving images as the delivery candidate moving image based on the number of times thus identified on per performer basis.

15. The information processing device according to claim 11, wherein
the processor identifies a different user who is in a predetermined relationship with a user and associated with the user identification information, and
the processor selects the at least one of the plurality of moving images as the delivery candidate moving image based on the criterion set according to information on the different user.

16. The information processing device according to claim 15, wherein
the processor selects at least one of the plurality of moving images as the delivery candidate moving image based on the moving image associated with a target competition which is the predetermined competition on which the different user has made a bet.

17. The information processing device according to claim 11, wherein
the processor selects the at least one of the plurality of moving images as the delivery candidate moving image based on the criterion set according to a result of machine learning using information associated with the user identification information.

18. The information processing device according to claim 11, wherein
the selected at least one of the plurality of moving images is regarding a bet on the predetermined competition on which betting is available at a location of the user terminal associated with the user identification information, as the delivery candidate moving image.

19. An information processing method for delivering, to a user terminal, a moving image on a bet made by predicting an outcome of a predetermined competition, the information processing method comprising:
causing a processor to communicate with a storage device that stores a plurality of moving images;
causing the processor to calculate an evaluation value of each of the plurality of moving images;
causing the processor to select at least one of the plurality of moving images as a delivery candidate moving image based on the calculated evaluation value filtered using a predetermined criterion;
causing the processor to generate a list of the delivery candidate moving image; and
causing the processor to send the user terminal the list of the delivery candidate moving image.

20. An information processing system comprising:
a user terminal, and
an information processing device configured to deliver, to the user terminal, a moving image on a bet made by predicting an outcome of a predetermined competition, wherein
the information processing device comprises a processor,
the processor is configured to communicate with a storage device that stores a plurality of moving images;
the processor calculates an evaluation value of each of the plurality of moving images;
the processor selects at least one of the plurality of moving images as a delivery candidate moving image based on the calculated evaluation value filtered using a predetermined criterion, and
the processor sends the user terminal the list of the delivery candidate moving image.

* * * * *